United States Patent [19]

Minegishi et al.

[11] Patent Number: 5,651,747

[45] Date of Patent: Jul. 29, 1997

[54] SERIES OF GEARED MOTORS

[75] Inventors: Kiyoji Minegishi, Chita-gun; Yuji Maeguchi, Ohbu; Masayuki Tanigawa, Kariya; Keiji Takehara, Ohbu, all of Japan

[73] Assignee: Sumitomo Heavy Industries, Ltd., Tokyo, Japan

[21] Appl. No.: 490,702

[22] Filed: Jun. 15, 1995

[30] Foreign Application Priority Data

Jun. 16, 1994 [JP] Japan ................................. 6-133478
Sep. 1, 1994 [JP] Japan ................................. 6-208594

[51] Int. Cl.$^6$ .................................................. F16H 1/32
[52] U.S. Cl. .................................. 475/176; 475/178
[58] Field of Search ............................ 475/176, 177, 475/178, 179, 338

[56] References Cited

U.S. PATENT DOCUMENTS

| | | | |
|---|---|---|---|
| 4,898,065 | 2/1990 | Ogata et al. | 475/178 X |
| 5,188,572 | 2/1993 | Yamaguchi et al. | 475/176 X |
| 5,286,237 | 2/1994 | Minegishi | 475/178 |
| 5,290,208 | 3/1994 | Minegishi | 475/176 X |
| 5,292,289 | 3/1994 | Ogata et al. | 475/176 |
| 5,328,419 | 7/1994 | Motl et al. | 475/338 X |
| 5,385,514 | 1/1995 | Dawe | 475/338 X |
| 5,433,672 | 7/1995 | Tanaka et al. | 475/178 |
| 5,472,384 | 12/1995 | Haga | 475/178 X |

*Primary Examiner*—Rodney H. Bonck
*Assistant Examiner*—Peter T. Kwon
*Attorney, Agent, or Firm*—Nikaido, Marmelstein, Murray & Oram LLP

[57] ABSTRACT

A series of geared motors in which change gear ratios of 1/2–1/100 or a wider range of change gear ratios are realized in the single series based on the unified design concepts of low noise, high rigidity and high durability, and in which the separation, exchange, etc. of the individual speed change gears and motors proper of the geared motors are facilitated. In the series, a speed change mechanism in each of the geared motors constituting a group of "high" change gear ratios comprises a single-stage type planetary gear mechanism of oscillating inner gearing system, a group of "medium" change gear ratios comprises a single-stage type simple planetary gear mechanism, and a group of "low" change gear ratios comprises a modified simple planetary gear mechanism including a sun gear (302 in FIG. 1), a first planet gear (304A), a second planet gear (304B) which rotates unitarily with the first planet gear (304A) and which has a larger number of teeth than the first planet gear (304A), and an internal gear (306). Herein, the principal gear ratio part of each of the speed change gears of the geared motors constituting the respective groups of change gear ratios is sealably supported at both the ends thereof.

12 Claims, 14 Drawing Sheets

SERIES OF GEARED MOTORS

BACKGROUND OF THE INVENTION

1. Field of the Invention

The present invention relates to geared motors. More particularly, it relates to a series of geared motors which are well suited for preparing various geared motors as a plurality of groups of products on the basis of technically reasonable ideas.

2. Description of the Prior Art

Heretofore, some series of geared motors, which include various motors combined with speed change gears and in each of which a plurality of change gear ratios can be selected, have been put on the market.

In the series of geared motors of this type, several kinds of sizes (assorted dimensions) generally called "frame work Nos." are set in conformity with mating machines. A plurality of change gear ratios are prepared for each "frame work No.". Each user may choose a geared motor which has a torque (capacity), a size or a rotational speed meeting a particular purpose, from within the series of geared motors classified as stated above.

As the geared motors in such series, there have hitherto been known ones in which a so-called "simple planetary gear mechanism" is adopted as the speed change mechanism of the speed change gears. The simple planetary gear mechanism includes a sun gear, a planet gear which meshes with the sun gear by means of outer gearing, and an internal gear with which the planet gear meshes by inner gearing.

Incidentally, the speed change gears function as "reduction gears" when used for lowering the rotational speed of a motor, and as "speedup gears" when used for raising the rotational speed of the motor by reversing the input and output of the identical speed change gears. The use as the reduction gears shall be mentioned below for the sake of convenience, and will be concretely explained with reference to FIG. 14.

First and second reduction portions A and B are respectively assembled in the reduction gears, and the simple planetary gear mechanism is adopted for both of them.

Both the first and second reduction portions A and B are similarly constructed. The first reduction portion A (the second reduction portion B) includes a sun gear 602 (702) which is endowed with a floating construction in order to realize an equal load distribution, a planet gear 604 (704) which meshes with the sun gear 602 (702) by outer gearing, and an internal gear 606 (706) with which the planet gear 604 (704) meshes by inner gearing. The planet gear 604 (704) is held by a planet frame or disc 608 (a planet frame or output shaft flange 708) which is arranged on one axial side thereof.

The operation of the reduction gears will be briefly explained together with the other constructions thereof.

When an input shaft 610 is rotated, the sun gear 602 of the first reduction portion A is rotated through a coupling 611. In accordance with the rotation of the sun gear 602, the planet gear 604 revolves round the sun gear 602 by inner gearing with the internal gear 606 which is fixed to a casing 612.

The planet gear 604 is supported through a bearing 616 by a supporting pin 614, the revolution around the sun gear 602 is transmitted to the disc (planet frame) 608. When the disc 608 is rotated, the sun gear 702 of the second reduction portion B connected to the disc 608 is rotated. In accordance with the rotation of the sun gear 702, the planet gear 704 revolves round the sun gear 702 by inner gearing with the internal gear 706 which is fixed to the casing 612.

The planet gear 704 is supported through a bearing 716 by a supporting pin 714, the revolution around the sun gear 702 is transmitted to the output shaft flange (planet frame) 708. The output shaft flange 708 is in spline connection with an output shaft 620, so that the output shaft 620 is rotated by the rotation of the output shaft flange 708.

In the geared motor which adopts such a simple planetary gear mechanism as the speed reduction mechanism of the reduction gears, the speed reduction mechanism can be constructed in a single stage ordinarily for reduction gear ratios of 1/3–1/9 or so. With the simple planetary gear mechanism, however, it is structurally difficult to attain a reduction gear ratio lower than 1/3, and it is especially impossible in theory to attain a reduction gear ratio of 1/2. It is accordingly common practice to set only the ratios of 1/3 and higher as the reduction gear ratios which are made ready within the identical framework No. in the specific series.

On the other hand, the simple planetary gear mechanism of the single-stage type is difficult of attaining a reduction gear ratio higher than 1/9, for example, a "high" reduction gear ratio of 1/30 or 1/100. (In this specification, a "high" ratio shall mean a large magnitude of gear change. Accordingly, the "high" reduction gear ratio has a comparatively small value, whereas a "high" speedup ratio has a comparatively large value. A "low" ratio will be self-explanatory.) In general, therefore, such a "high" reduction gear ratio is attained by the two-stage type as in the prior-art example stated above, or by a three-stage type. The multi-stage type, however, is problematic as explained below. When it is intended to simultaneously realize the "low" reduction gear ratios and the "high" reduction gear ratios (that is, to prepare a product having both the "low" and "high" ratios) in the identical framework No., in other words, under the condition that the assorted dimensions (sizes) for the mating machines are the same, the reduction gears on the side of the "low" reduction gear ratios become unnecessarily large in size. This incurs a waste as the whole series. It is accordingly the actual situation that the reduction gears of very "high" ratios are not normally made in a series of geared motors adopting the simple planetary gear mechanism.

Meanwhile, as series of geared motors affording reduction gears of comparatively "high" ratios, there have hitherto been marketed ones in which a planetary gear mechanism having an oscillating inner gearing system is adopted as the mechanism of the reduction gears of the geared motors.

The planetary gear mechanism of the oscillating inner gearing system includes a first shaft, an eccentric body which is attached on the first shaft, an external gear which is mounted so as to be capable of eccentrically rotating relative to the first shaft through the eccentric body, an internal gear with which the external gear meshes by inner gearing, and a second shaft which is connected to the external gear through means for transmitting only the component of the revolution of the external gear on the axis thereof. This planetary gear mechanism is known as one in which reduction gear ratios of 1/6–1/119 or so can be realized in one stage.

A practicable structural example is illustrated in FIGS. 15 and 16. This example has offered the above planetary gear mechanism to the "geared motor for speed reduction" in such a way that the first shaft is set as an input shaft (connected with a motor), while the second shaft is set as an output shaft, and that the internal gear is fixed.

Referring to FIGS. 15 and 16, an eccentric body 870 is snugly fitted on an input shaft 810 through a key 872. An external gear 876 is mounted on the eccentric body 870 through a bearing 874. The external gear 876 is provided with a plurality of inner roller holes 878, in each of which an inner pin 814 and an inner roller 814A are inserted.

The external gear 876 is formed at its outer periphery with outward teeth 877 each of which has a trochoidal tooth profile, a circular arc tooth profile or the like. The outward teeth 877 are in inner gearing with an internal gear 806 which is fixed to a casing 812. The inward teeth of the internal gear 806 are concretely so constructed that outer pins 880 are held easy of rotation by the sliding engagement thereof with the walls of corresponding outer pin holes 882.

The inner pins 814 each penetrating through the external gear 876 are fixed to the flange part 808 of an output shaft 820. The flange part 808 is connected with the input shaft 810 through an output side bearing 874.

When the input shaft 810 is rotated one revolution, the eccentric body 870 performs one revolution. In accordance with the revolution of the eccentric body 870, the external gear 876 is about to oscillatingly rotate round the input shaft 810. Since, however, the external gear 876 has its revolution on the axis thereof restricted by the internal gear 806, it almost performs only oscillations in inner gearing with the internal gear 806.

Assuming by way of example here that the number of teeth of the external gear 876 is N and that the number of teeth of the internal gear 806 is N+1, the difference between the numbers of teeth is 1 (one). Therefore, each time the input shaft 810 performs one revolution, the external gear 876 rotates only in correspondence with one tooth relative to the internal gear 806 fixed to the casing 812 (that is, it revolves on its axis to the amount of one tooth). This signifies that one revolution of the input shaft 810 is reduced to −1/N revolution of the external gear 876. Incidentally, the minus sign signifies the reverse rotation.

Herein, while the oscillating component of the revolution of the external gear 876 is absorbed by clearances defined between the inner roller holes 878 and the corresponding inner rollers 814A, only the component thereof on the axis of the external gear 876 is transmitted to the output shaft 820 through the inner pins 814.

Thus, the speed reduction at the reduction gear ratio of −1/N is eventually achieved.

In the prior-art example, the internal gear of the inner-gearing planetary gear mechanism is fixed, and the first shaft and second shaft are respectively employed as the input shaft (connected with the motor) and output shaft. Alternatively, however, reduction gears for a geared motor can also be constructed by fixing the second shaft and employing the first shaft and internal gear as the input shaft and output shaft, respectively. Further, speedup gears for a geared motor for speedup use can be constructed by reversing the input and output of the above speed change gears.

As already stated, the series of geared motors adopting the simple planetary gear mechanism in the prior art are structurally difficult of attaining the change gear ratio lower than 1/3, and they are theoretically incapable of attaining the change gear ratio of 1/2. Therefore, a geared motor affording the change gear ratio of 1/2 has never been prepared within the identical framework No. in the specific series.

On the other hand, regarding "medium" and "high" change gear ratios (the "medium" ratio being intermediated between the "low" and "high" ratios), geared motors in which change gear ratios of, for example, 1/3–1/100 are made ready in an identical series have not hitherto been offered, either. It has accordingly been impossible for each user to freely replace his/her geared motor with a geared motor of the same assorted dimensions differing in only the change gear ratio.

This point will be explained in more detail.

As stated before, in the series of geared motors adopting the planetary gear mechanism of the oscillating inner gearing system in the prior art, only the change gear ratios of 1/6 and higher have been made ready. This is ascribable to the fact that the oscillating inner-gearing planetary gear mechanism is difficult of setting a change gear ratio lower than 1/6 in relation to the speed reduction mechanism thereof. Accordingly, the user who wants to attain the change gear ratio lower than 1/6 has hitherto inevitably selected a geared motor which belongs to another series, for example, the series of geared motors employing the preceding simple planetary gear mechanism.

Why the two different series have heretofore been separately existent, is chiefly based on technical reasons as explained below.

Originally, a low output shaft speed and a "high" change gear ratio (a high torque) are often intended in the geared motor adopting the planetary gear mechanism of the oscillating inner gearing system. Inevitably, the sizes of an output shaft etc. for mating machines become large relative to the size of a motor. Moreover, noise reduction is required of the geared motor in many cases.

In contrast, a comparatively high output shaft speed and a "low" reduction gear ratio (a low torque) are needed in the geared motor adopting the simple planetary gear mechanism. Accordingly, the sizes of an output shaft etc. for mating machines may be small relative to the size of a motor. Therefore, it results in a weight increase and an excessive quality and it is difficult to conform the sizes of the output shafts to those of the series of the planetary gear mechanism of the oscillating inner gearing system.

Besides, in the geared motors of the simple planetary gear mechanism, the construction of floating a sun gear is generally adopted in order to realize an "equal load distribution" in compliance with the request of keeping favorable high-speed rotations for a long term. This leads to the problem that noise reduction in the simple planetary gear mechanism is difficult. The problem is inconsistent with the series of the planetary gear mechanism making use of the oscillating inner gearing system which is eagerly requested to reduce the noise.

The situation where the geared motors can be supplied in only the different series with the boundary at the change gear ratio around 1/6 in this manner, incurs various drawbacks in the aspect of convenience in use or in the aspect of pure technology.

By way of example, let's consider a case where the user having a certain material handling equipment being driven at the change gear ratio of 1/6 wants to lower the ratio to about 1/5 by any cause. In this case, the series of the geared motors which can be supplied differs from that of the user's geared motor, so that both the series are different in all of the assorted dimensions with the material handling equipment, the diameter of the output shaft, the height of the axis of the geared motor (as measured from the mounting plane of the geared motor), etc. Moreover, even the sorts of the motors (concretely, the torque or the basic rotational speed of the motor) are sometimes different. Therefore, the design of the installed machine needs to be altered considerably on the user side.

Also in the aspect of technical performance, in a case where the geared motor at the change gear ratio of 1/6 has been replaced with the geared motor at the ratio of 1/5 by way of example, the user must submit to problems such as an abrupt increase in noise, because of the different design concepts of both the geared motors. That is, the user cannot introduce the new geared motor of the slightly different change gear ratio while keeping the continuity of the performance, in spite of the geared motors of identical in-line type. Besides, the geared motors in the different series are not interchangeable or exchangeable at all in points of the size and the capacity.

Further, from the viewpoints of the interchangeability or exchangeability, in any of the series of geared motors in the prior art, the exchange of a motor requires the overhaul of most part of speed change gears for changing oil seals etc. and the subsequent reassemblage thereof. As a result, a serious problem to be stated below has been posed.

In recent years, various capabilities have been required of motors to be adopted in accordance with intended uses, in fields utilizing such geared motors (for example, in the field of material handling systems). By way of example, in spite of the same horsepower, there have come into uses multifarious motors with accessory control circuits taken into account, such as a mere induction motor which is conventional, a motor which is furnished with a brake, a motor which undergoes only a slight backlash and therefore incurs no positional shift even in a reciprocating motion, a motor which has an inverter control circuit and can accordingly control revolutions per minute at a constant torque, and a motor which is completely rendered waterproof in order to enhance safety.

Much importance is accordingly attached, not only to the requirement that the geared motor itself can be assembled in a short time period at the assembling stage thereof, but also to the requirement that the motor which is currently installed and used in, for example, the material handling system can be exchanged with ease and in a short time period in compliance with an altered purpose. Herein, it cannot satisfy the requirement of nowadays that the speed change gears must be mostly overhauled in the exchange of the motor as stated above.

In addition to such circumstances, the selection of the geared motor in the different series has heretofore been necessitated due to the slightly different change gear ratio as explained above. In the case of involving the alteration of the change gear ratio of or near 1/6, therefore, it has been quite impossible to meet the requirement that only the motor is exchanged in the short time period in compliance with the user's purpose.

SUMMARY OF THE INVENTION

The present invention has been made in view of the problems of the prior art as stated above, and has for its object to provide a series of geared motors in which change gear ratios from a "low" change gear ratio of, for example 1/2, which ratio has hitherto been made ready even in the series of geared motors based on the simple planetary gear mechanism, to a "high" change gear ratio having hitherto been made ready by only the planetary gear mechanism having an oscillating inner gearing system, are made ready under the unified design concept of "noise reduction".

Furthermore the present invention also has for its object to provide a series of geared motors which permit the offer of geared motors of both "low" change gear ratios and low noise, which have hitherto been unavailable (due to the properties of the offered series), and which permit the easy combinations of speed change gears with any motors (motors proper) or any mating machines at any change gear ratios (irrespective of the concrete internal mechanisms of speed change gears), so that the needs of users at purchases (and the alterations of the needs after the purchases) can be versatilely coped with, with the result that geared motors of many variations can be realized with a decreased stock as the whole series.

According to a first aspect of the present invention, in a series of geared motors in which the plurality of geared motors include various motors (motors proper) and speed change gears in combination and in which a plurality of change gear ratios can be selected under a condition that assorted dimensions for mating machines are the same, a construction as stated below is adopted, whereby a "low" change gear ratio of 1/2 or so having been unattainable in the prior-art series of geared motors based on the planetary gear mechanism can be especially made ready within the identical series. That is, a series of geared motors wherein: each of the geared motors constituting a group of "high" change gear ratios in the series comprises a single-stage type planetary gear mechanism having an oscillating inner gearing system as a speed change mechanism of the speed change gears, the single-stage type planetary gear mechanism of oscillating inner gearing system including a first shaft, an eccentric body which is fitted on the first shaft, an external gear which is mounted so as to be capable of revolving eccentrically to the first shaft through the eccentric body, an internal gear with which the external gear is in inner gearing, means for transmitting only a component of the revolution of the external gear on an axis thereof, and a second shaft which is connected to the external gear through the transmission means; each of the geared motors constituting a group of "low" change gear ratios in the series comprises a single-stage type simple planetary gear mechanism as a speed change mechanism of the speed change gears, the single-stage type simple planetary gear mechanism including a sun gear, a planet gear which is in outer gearing with the sun gear, and an internal gear with which the planet gear is in inner gearing; and a principal gear ratio part of each of the speed change gears of the geared motors constituting the group of "high" change gear ratios and the speed change gears of the geared motors constituting the group of "low" change gear ratios is sealably supported at both ends thereof.

According to another aspect of the present invention, in a series of geared in motors in which the plurality of geared motors include various motors and speed change gears in combination, and wherein a plurality of change gear ratios can be selected under a condition that assorted dimensions for mating machines are the same; a construction as stated below is adopted, whereby the supporting constructions of the planetary gears are especially contrived so that the geared motors of the "low" (and "medium") change gear ratios and those of the "high" change gear ratios can reasonably coexist within the identical series. That is, the series of geared motors wherein: each of the geared motors constituting a group of "high" change gear ratios in the series comprises a simple planetary gear mechanism as a speed change mechanism of the speed change gears, the simple planetary gear mechanism including a sun gear, a planet gear which is in outer gearing with the sun gear, and an internal gear with which the planet gear is in inner gearing; each of the geared motors constituting a group of "low" change gear ratios in the series comprises a modified simple planetary gear mechanism as a speed change mechanism of the speed change gears, the modified simple planetary gear mechanism including a sun gear, a first planet gear which is in outer gearing with the sun gear, a second planet gear which rotates unitarily with the first planet gear and which is provided with a larger number of teeth than the first planet gear, and an internal gear which is in inner gearing with the second planet gear; and a principal gear ratio part of each of the speed change gears of the geared motors constituting the group of "high" change gear ratios and the speed change gears of the geared motors constituting the group of "low" change gear ratios is sealably supported at both ends thereof.

According to a further aspect of the present invention, in a series of geared motors in which the plurality of geared motors include various motors (motors proper) and speed change gears in combination and in which a plurality of change gear ratios can be selected under a condition that assorted dimensions for mating machines are the same, a construction as stated below is adopted, whereby the series according to both previously described aspects are reasonably united so that reduction gear ratios from "very low" ones including 1/2, to "high" ones of 1/100 and higher can be covered within the identical series of the unified design concept. That is, the series of geared motors wherein: each of the geared motors constituting a group of "high" change gear ratios in the series comprises a single-stage type planetary gear mechanism of oscillating inner gearing system as a speed change mechanism of the speed change gears, the single-stage type planetary gear mechanism of oscillating inner gearing system including a first shaft, an eccentric body which is fitted on the first shaft, an external gear which is mounted so as to be capable of revolving eccentrically to the first shaft through the eccentric body, an internal gear with which the external gear is in inner gearing, means for transmitting only a component of the revolution of the external gear on an axis thereof, and a second shaft which is connected to the external gear through the transmission means; each of the geared motors constituting a group of "medium" change gear ratios in the series comprises a single-stage type simple planetary gear mechanism as a speed change mechanism of the speed change gears, the single-stage type simple planetary gear mechanism including a sun gear, a planet gear which is in outer gearing with the sun gear, and an internal gear with which the planet gear is in inner gearing; each of the geared motors constituting a group of "low" change gear ratios in the series comprises a modified simple planetary gear mechanism as a speed change mechanism of the speed change gears, the modified simple planetary gear mechanism including a sun gear, a first planet gear which is in outer gearing with the sun gear, a second planet gear which rotates unitarily with the first planet gear and which is set larger in the number of teeth than the first planet gear, and an internal gear which is in inner gearing with the second planet gear; and a principal gear ratio part of each of the speed change gears of the geared motors constituting the group of "high" change gear ratios, the speed change gears of the geared motors constituting the group of "medium" change gear ratios, and the speed change gears of the geared motors constituting the group of "low" change gear ratios is sealably supported at both ends thereof.

The inventors first proposed a series of geared motors (Japanese Patent Application No. 133478/1994) in which a simple planetary gear mechanism of single-state type is adopted as the speed change mechanism of speed change gears for geared motors constituting a group of "low" change gear ratios (a group of "medium" change gear ratios in another aspect of the present invention), while a planetary gear mechanism of oscillating inner gearing system is adopted as the speed change mechanism of speed change gears for geared motors constituting a group of "high" change gear ratios, and which technically features that change gear ratios of 1/3–1/6 are especially included and that all change gear ratios of 1/100 and higher can be ensured by the speed change gears of single-stage type.

Another feature of the present invention consists in that change gear ratios are more expanded to the "low" change gear ratio side with respect to the improved series mentioned above, and that all change gear ratios of 1/2–1/100 or so can be achieved by the planetary gear mechanism which is substantially of the single-stage type.

In other words, first described; aspect of the present invention has been taken note of the part of the "high" change gear ratios—the "medium" change gear ratios in the series, while another aspect has been taken note of the part of the "medium" change gear ratios—the "low" change gear ratios in the series. An additional aspect has been taken note of further uniting the series of previously described aspects (the "high" change gear ratios—the "medium" change gear ratios—the "low" change gear ratios). Accordingly, this additional aspect covers both previously described aspects in contents. For the sake of convenience, therefore, the operation of that additional aspect shall be described as representing the entirety of the present invention.

In the present invention, the simple planetary gear mechanism is basically adopted in order to attain "very low" change gear ratios of, for example, 1/2, and furthermore, it is somewhat contrived (because this mechanism left intact is theoretically incapable of attaining the change gear ratio of 1/2).

More specifically, the planet gears of the simple planetary gear mechanism consist of a first planet gear, and a second planet gear which is larger in the number of teeth than the first planet gear, the first and second planet gears being made unitary. The first planet gear is held in mesh with the sun gear, while the second planet gear is held in mesh with the internal gear.

Thus, one revolution of the first planet gear having the smaller number of teeth is caused to function as one revolution of the second planet gear having the larger number of teeth. Here, it is possible to substantially execute a change gear ratio in the reverse direction (speedup in case of executing reduction as the entire gear shift, and reduction in case of executing speedup as the entire gear shift).

This signifies that, in a case where the number of teeth of the second planet gear is selected to be, for example,. 1.5 times larger than the number of teeth of the first planet gear so as to execute a reverse change gear ratio of 1.5, the combination of the sun gear and the internal gear having hitherto afforded the change gear ratio of 1/3 can realize the change gear ratio of 1/2 as the whole simple planetary gear mechanism.

In the present invention, the modified simple planetary gear mechanism of such a construction is adopted as the speed change mechanism of the speed change gears of the geared motors constituting the group of "low" change gear ratios. Thereupon, the single-stage type simple planetary gear mechanism is adopted as the speed change mechanism of the speed change gears of the geared motors constituting the group of "medium" change gear ratios, and the single-stage type planetary gear mechanism of the oscillating inner gearing system as the speed change mechanism of the speed change gears of the geared motors constituting the group of "high" change gear ratios.

Herein, for the purpose of permitting the mechanisms to coexist in the single (identical) series reasonably without a sense of incompatibility, a construction to be stated below is further added.

That is, in the present invention, each of the speed change gears of the "low" change gear ratios, "medium" change gear ratios and "high" change gear ratios has its principal gear ratio part which is constructed so as to "be sealably supported at both the ends thereof". Thus, the speed change gears and the motor (motor proper) can be separated from each other, exchanged, moved or stored in the state in which the lubricating oils thereof are hermetically confined as they are.

As a result, insofar as the same framework No. is met, any of the speed change gears of the simple planetary gear mechanism, those of the modified simple planetary gear mechanism and those of the oscillating inner-gearing planetary gear mechanism can be freely selected accordance with the change gear ratio, and it can be easily exchanged. Besides, as viewed from the side of the speed change gears, any of a conventional induction motor and motors endowed with special functions can be freely selected in accordance with the intended use.

Further, owing to the both-end supported construction of the principal gear ratio part, the mounting rigidity thereof can be kept very high, so that the stabler rotation, higher durability and quieter operation of the geared motor can be achieved.

More specifically, since the principal gear, ratio part is supported at both its ends and can have its mounting precision enhanced, the geared motor of the simple planetary gear mechanism (or the modified simple planetary gear mechanism) can dispense with the construction of floating a sun gear as has hitherto been indispensable in order to realize an equal load distribution. A bearing for supporting a planet gear can also be dispensed with.

It is consequently possible to eliminate the noise factors having formed serious obstacles to the realization of reduced noise (the floating of the sun gear and the supporting of the planet gear through the bearing have been major factors for noise increase in the prior art). Thus, even when the speed change gears of the simple planetary gear mechanism (or the modified simple planetary gear mechanism) and those of the oscillating inner-gearing planetary gear mechanism are caused to coexist in the single (identical) series, very quiet operations can be carried out without the sense of incompatibility.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the embodiments of the present invention will be described in detail in conjunction with the accompanying drawings.

In order to facilitate understanding, reference shall be first had to the construction of a geared motor of the simplest structure which constitutes a group of "medium" reduction gear ratios, that is, a geared motor in which a motor (motor proper) is combined with reduction gears adopting a simple planetary gear mechanism of single-stage type.

Figure 6:
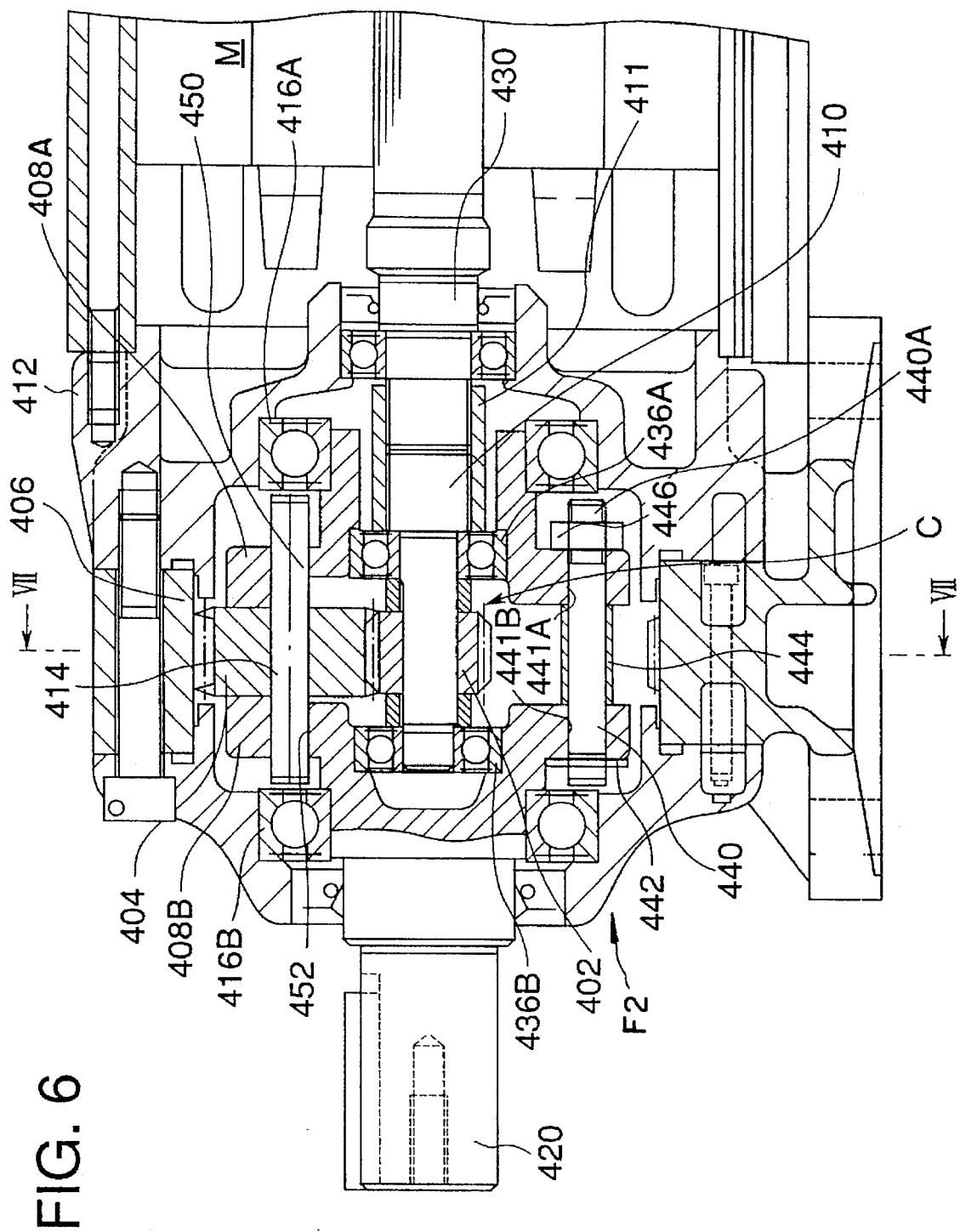
FIG. 6 is a front view of a geared motor belonging to a group of "medium" reduction gear ratios in the series to which the present invention is applied, a reduction portion being shown in a fragmentary axial section.
Figure 7:
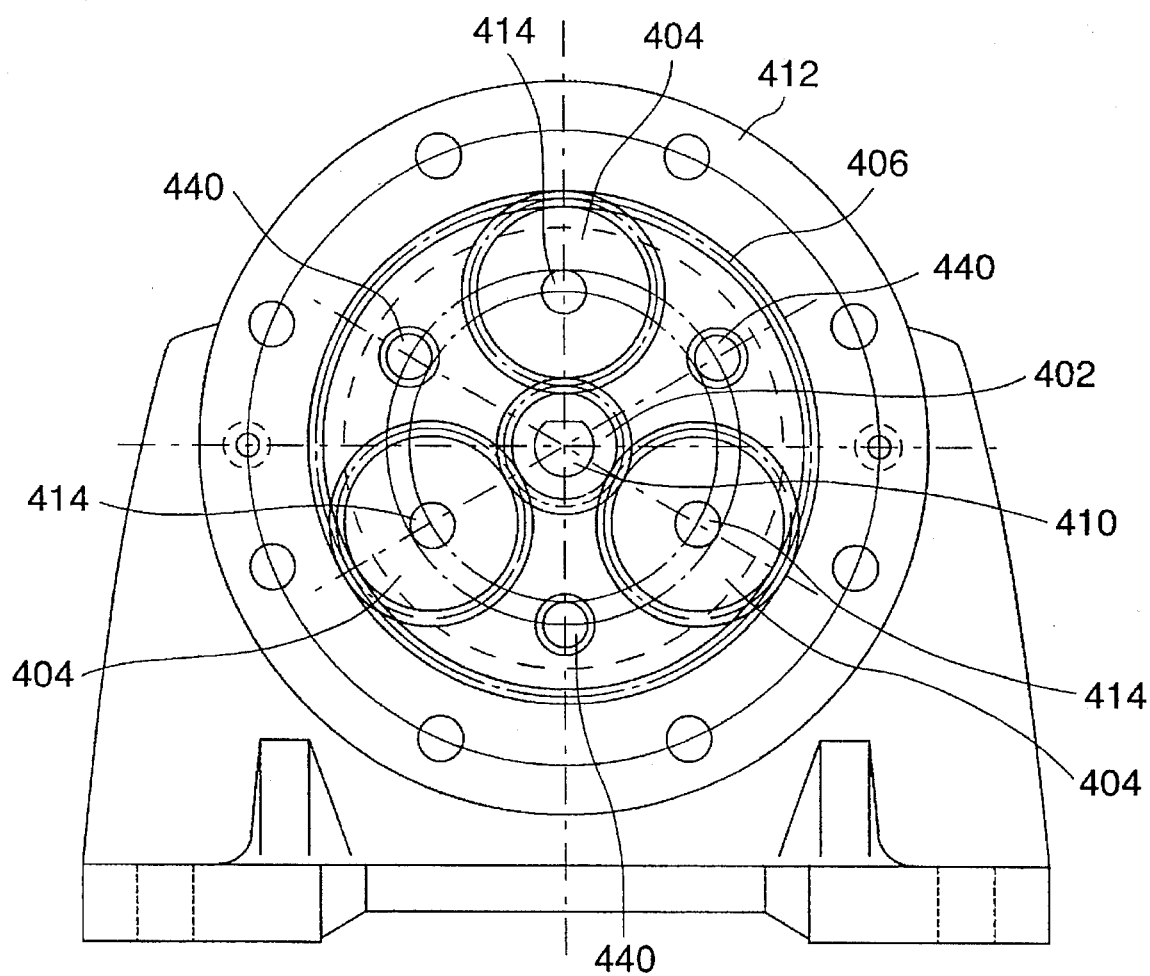
FIG. 7 is a sectional view taken along line VII—VII in FIG. 6.
Figure 14:
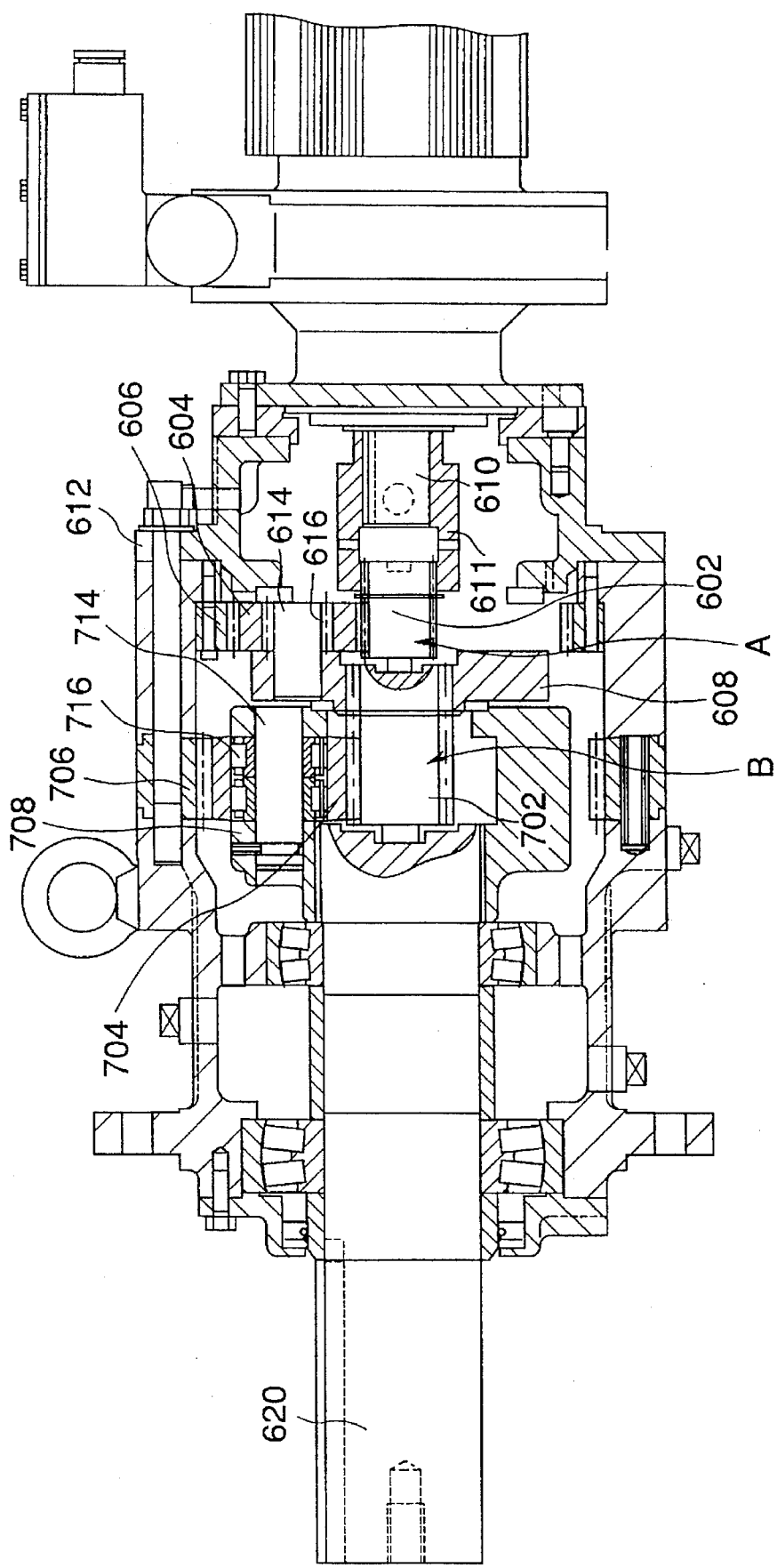
FIG. 14 is a front view of a geared motor having reduction gears based on a simple planetary gear mechanism in the prior art, reduction portions being shown in fragmentary axial sections.

FIG. 6 is a front view, partially broken away, of the reduction gears of the geared motor, while FIG. 7 is a sectional view taken along line VII—VII in FIG. 6. Incidentally, components similar to those of the prior-art geared motor shown in FIG. 14 are respectively assigned symbols having the same two lower digits.

The reduction gears of the geared motor shown in FIGS. 6 and 7 adopt the simple planetary gear mechanism as the construction of their reduction portion C. The simple planetary gear mechanism includes a sun gear 402, planet gears 404 which mesh with the sun gear 402 by outer gearing, respectively, and an internal gear 406 with which the respective planet gears 404 mesh by inner gearing.

The sun gear 402 is connected with an input shaft 410 formed by so-called "D cutting", and it does not especially adopt a floating construction for realizing an equal load distribution (the construction forms a cause for noise increase). The input shaft 410 is connected with the motor shaft 430 of the motor M through a coupling 411.

The respective planet gears 404 lie in outer gearing with the sun gear 402, and lie in inner gearing with the internal gear 406.

Each of the planet gears 404 is supported by a supporting pin 414 so as to be capable of sliding rotation. All the supporting pins 414 are supported on both the sides thereof by a pair of planet frames so as to be capable of sliding rotations. Concretely, in this embodiment, the pair of planet frames are constituted by a carrier 408A which is arranged on the input shaft side (the right side as viewed in FIG. 6), and an output shaft flange 408B which is formed so as to be integral with an output shaft 420. The carrier 408A and the output shaft flange 408B are respectively formed with supporting-pin holding holes 450 and 452, in which the supporting pins 414 have both the ends thereof supported so as to be capable of the sliding rotations.

Both the planet frames, namely, the carrier 408A and the output shaft flange 408B are supported by a casing 412 through bearings 416A and 416B independently of each other so as to be rotatable (coaxially with the sun gear 402).

By the way, the bearings 416A and 416B also fulfill the functions of stoppers which serve to prevent the supporting pins 414 from coming off in the axial directions thereof.

The internal gear 406 is fixed to the casing 412. The input shaft 410 is supported by the pair of planet frames, namely, the carrier 408A and the output shaft flange 408B through respective ball bearings 436A and 436B.

The carrier 408A and the output shaft flange 408B (the pair of planet frames) are securely fixed and connected to each other by carrier pins 440 (which are members different from the supporting pins 414). Concretely, a snap ring 442 is fitted on one end side of each of the carrier pins 440. Besides, a screw 44.0A is formed on the other end side of each of the carrier pins 440. Further, carrier pin holes 441A and 441B are respectively formed in the carrier 408A and the output shaft flange 408B. The carrier pin 440 is caused to penetrate through the carrier pin holes 441A and 441B with a spacer 444 interposed therebetween. A nut 446 is threadably engaged with the screw 440A of the carrier pin 440, and is tightened. Thus, the carrier 408A and the output shaft flange 408B are connected.

The connection of the carrier 408A and the output shaft flange 408B by the carrier pins 440 is not always indispensable. Since, however, both the planet frames 408A and 408B are unitarily rotated at equal speeds without fail by the presence of the carrier pins 440, the supporting pins 414 can be effectively prevented from undergoing eccentric loads tangential to the orbits of their revolutions around the sun gear 402, and they can be always supported favorably.

Next, the operation of the geared motor belonging to the group of "medium" change gear ratios will be described.

When the motor shaft 430 is rotated, the input shaft 410 is rotated through the coupling 411, and the sun gear 402 held in spline connection with the input shaft 410 is rotated at the same speed. In accordance with the rotation of the sun gear 402, the planet gears 404 revolve round the periphery of the sun gear 402 in inner gearing with the internal gear 406 which is fixed to the casing 412.

The revolutions of the planet gears 404 around the sun gear 402 are transmitted to the pair of planet frames, namely, the carrier 408A and the output shaft flange 408B through the supporting pins 414. The power of the revolutions transmitted to the side of the output shaft flange 408B is transmitted to the output shaft 420 directly, while the power of the revolutions transmitted to the side of the carrier 408A is transmitted thereto through the carrier pins 440 and the output shaft flange 408B.

Herein, the carrier 408A and the output shaft flange 408B are both supported by the casing 412 through the respective ball bearings 416A and 416B independently of each other, so that the mounting and rotating precisions of the supporting pins 414 can be kept very high. Besides, a high rigidity is ensured for the whole reduction gears against loads in radial directions as exerted from the side of the output shaft 420. Accordingly, the input shaft 410 and the other members can also be supported at high precisions. Therefore, the sun gear 402 need not be floated, and noise in the operation of the geared motor can be reduced to that extent (because one factor for the noise increase is eliminated).

Further, since the carrier 408A and the output shaft flange 408B are securely fixed and connected through the carrier pins 440, they rotate at the same speed without fail, and the eccentric loads tangential to the orbits of the revolutions of the supporting pins 414 around the sun gear 402 can be correspondingly prevented from acting on these pins 414.

Moreover, the supporting pins 414 are adapted to slidingly rotate relative to the planet gears 404, and they are also adapted to slidingly rotate relative to the carrier 408A as well as the output shaft flange 408B (they are not fixed to these planet frames). Therefore, the relative sliding speeds between the supporting pins 414 and the planet gears 404 are correspondingly lowered. Conjointly with the high mounting precision of the supporting pins 414 themselves, accordingly, the planet gears 404 can be supported so as to smoothly rotate for a long term (without the provision of bearings which form a cause for the noise increase). Consequently, no shaft noise is involved, so that the noise in the operation of the geared motor is further reduced, and the number of components of the geared motor can be further decreased.

Secondly, there will be described the construction of a geared motor which constitutes a group of "low" reduction gear ratios in the series of geared motors according to the present invention, that is, a geared motor in which a motor (motor proper) is combined with reduction gears adopting a modified simple planetary gear mechanism of single-stage type.

Figure 1:
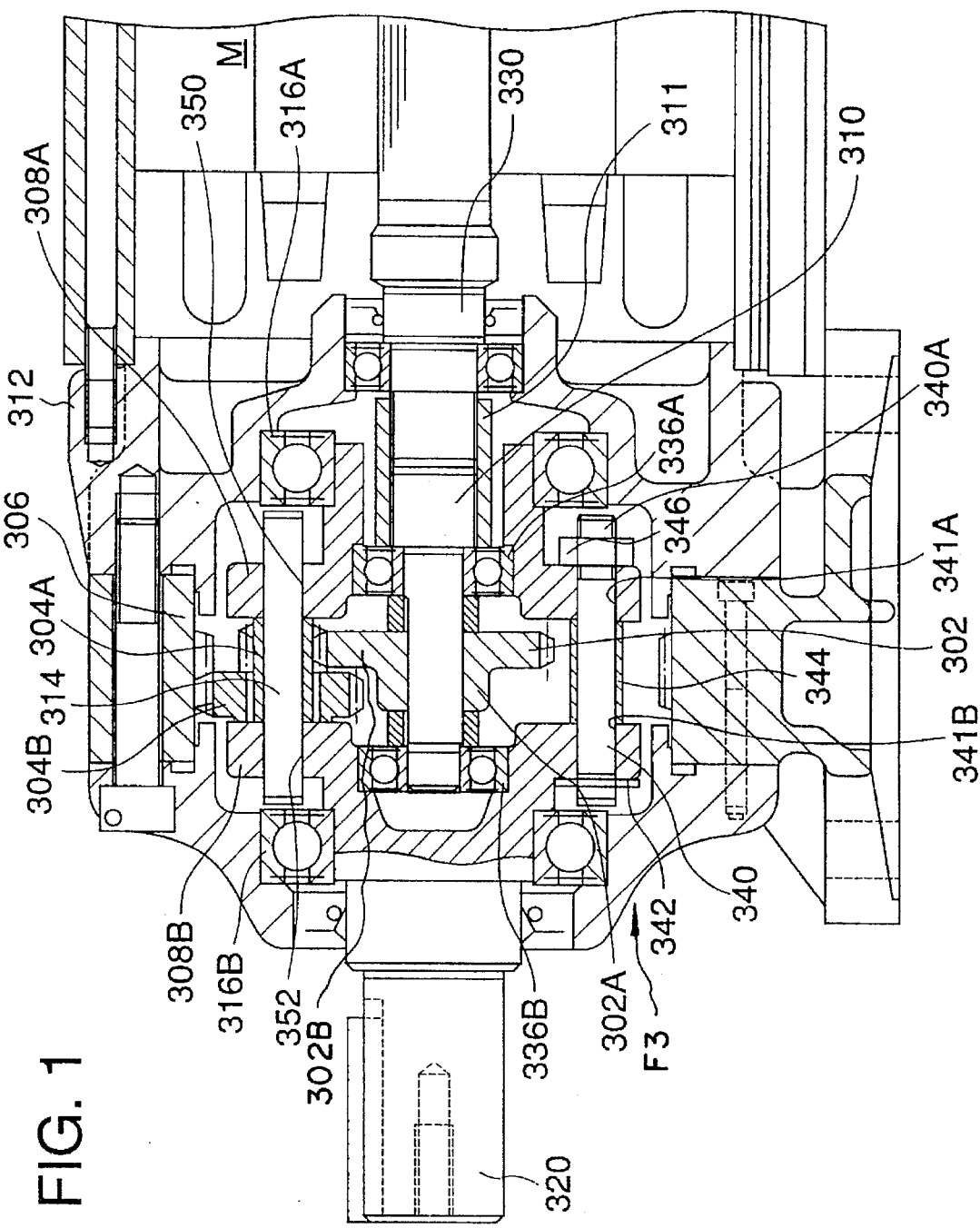
FIG. 1 is a front view of a geared motor belonging to a group of "low" reduction gear ratios in a series to which the present invention is applied, a reduction portion being shown in a fragmentary axial section.
Figure 2:
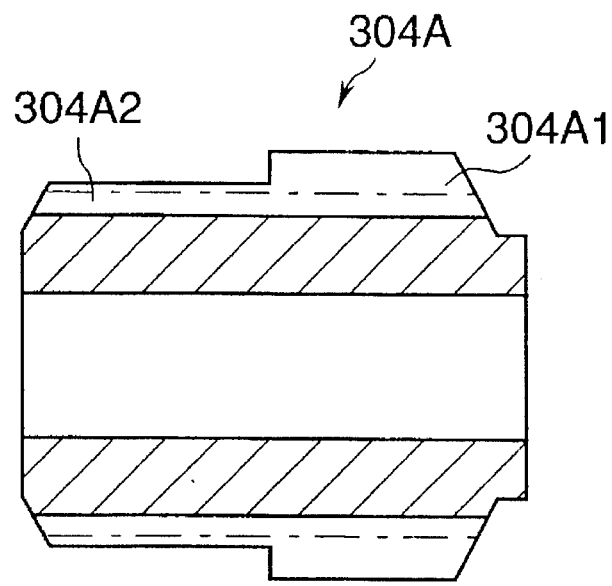
FIG. 2 is a front view of the first planet gear of the geared motor.
Figure 3:
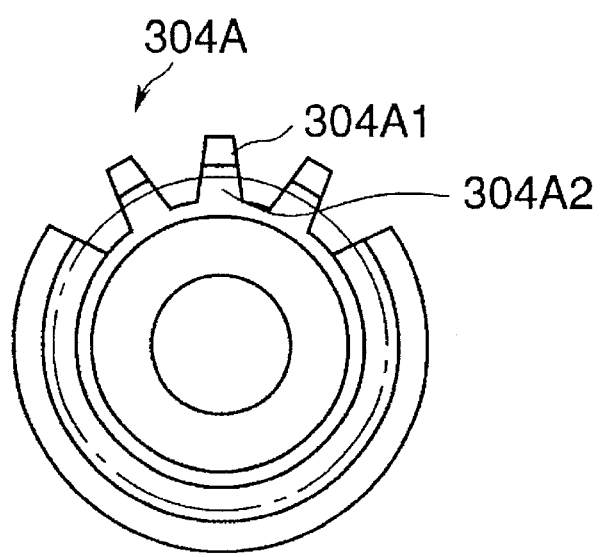
FIG. 3 is a side view of the first planet gear.
Figure 4:
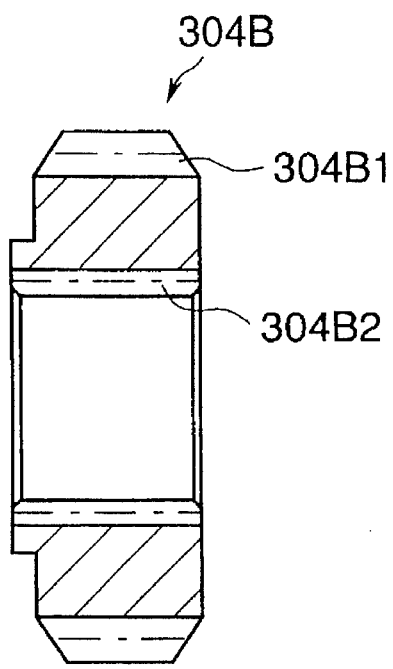
FIG. 4 is a front view of the second planet gear of the geared motor.
Figure 5:
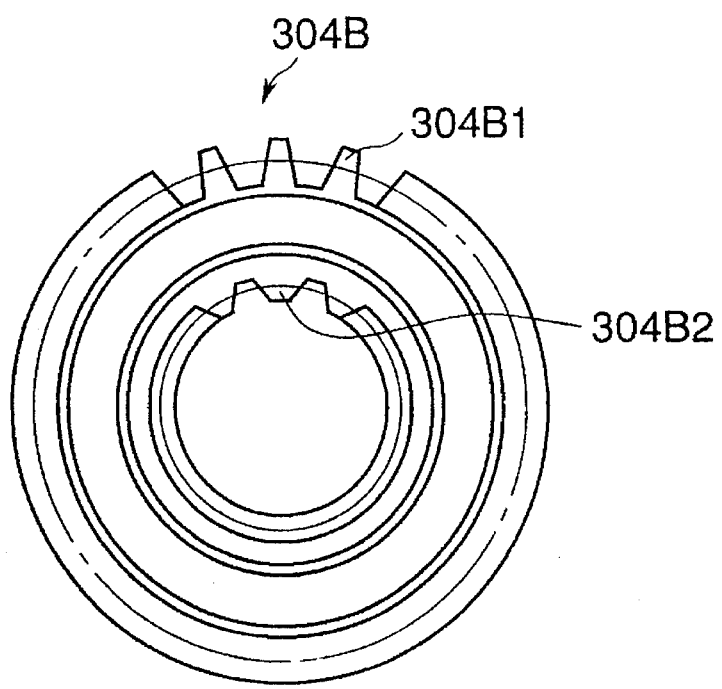
FIG. 5 is a side view of the second planet gear.

FIG. 1 is a front view, partially broken away, of the reduction gears of the geared motor, FIGS. 2 and 3 are a front view and a side view showing the first planet gear of the reduction gears, respectively, and FIGS. 4 and 5 are a front view and a side view showing the second planet gear of the reduction gears, respectively. Incidentally, components similar to those of the reduction gears in the group of "medium" reduction gear ratios as shown in FIGS. 6 and 7 are respectively assigned symbols having the same two lower digits.

The reduction gears of the geared motor shown in FIGS. 1–5 adopt the modified simple planetary gear mechanism as the construction of their reduction portion. The modified simple planetary gear mechanism includes a sun gear 302, the first planet gear 304A which meshes with the sun gear 302 by outer gearing, the second planet gear 304B which rotates unitarily with the first planet gear 304A and which is set larger in the number of teeth than that of the first planet gear 304A, and an internal gear 306 which meshes with the second planet gear 304B by inner gearing.

The sun gear 302 includes a cylinder portion 302A, and a disc portion 302B formed with outward teeth, and is connected with an input shaft 310 formed by the so-called "D cutting". This sun gear 302 does not especially adopt the floating construction for realizing equal load distribution (this construction forms the cause for noise increase), either. The input shaft 310 is connected with the motor shaft 330 of the motor M through a coupling 311.

As shown in FIGS. 2 and 3, the first planet gear 304A is substantially in the shape of a cylinder. The right axial half of this gear 304A as viewed in FIG. 2 is formed with outward teeth 304A1, while the left half thereof is formed with outward splines 304A2.

As shown in FIGS. 4 and 5, the second planet gear 304B is substantially in the shape of a doughnut. It includes inward splines 304B2 which mesh with the outward splines 304A2 of the first planet gear 304A, respectively. Besides, the second plant gear 304B is formed at its outer periphery with outward teeth 304B1, the number of which is larger than that of the outward teeth 304A1 of the first planet gear 304A.

The first planet gear 304A and the second planet gear 304B are made unitary with each other through the outward and inward splines 304A2 and 304B2. The first planet gear 304A lies in outer gearing with the sun gear 302, while the second planet gear 304B lies in inner gearing with the internal gear 306. Although not particularly shown in the drawings, three unitary structures each being composed of the first and second planet gears 304A and 304B are included like the foregoing embodiment (see FIG. 7). It is to be understood, however, that the number of the unitary structures is a mere example, and that only one unitary structure can be disposed in some cases.

Here, the single unitary structure shall be referred to for the brevity of description. The first and second planet gears 304A and 304B are supported by a supporting pin 314 so as to be capable of sliding rotation. The supporting pin 314 is supported at both the ends thereof by a pair of planet frames so as to be capable of sliding rotation. Concretely, as in the construction of the group of "medium" reduction gear ratios stated before, the pair of planet frames are constituted by a carrier 308A which is arranged on the input shaft side (the right side as viewed in FIG. 1), and an output shaft flange 308B which is formed so as to be integral with an output shaft 320. The carrier 308A and the output shaft flange 308B are respectively formed with supporting-pin holding holes 350 and 352, in which the supporting pin 314 has both the ends thereof supported so as to be capable of the sliding rotation. Both the planet frames, namely, the carrier 308A and the output shaft flange 308B are supported by a casing 312 through respective bearings 316A and 316B independently of each other so as to be rotatable (coaxially with the sun gear 302). The bearings 316A and 316B also fulfill the functions of stoppers which serve to prevent the supporting pin 314 from coming off in the axial direction thereof.

The internal gear 306 is fixed to the casing 312. The input shaft 310 is supported by the pair of planet frames, namely, the carrier 308A and the output shaft flange 308B through respective ball bearings 336A and 336B.

The carrier 308A and the output shaft flange 308B (the pair of planet frames) are securely fixed and connected to each other by carrier pins 340 (which are members different from the supporting pins 314). Concretely, as in the construction of the group of "medium" reduction gear ratios stated before, a snap ring 342 is fitted on one end side of each of the carrier pins 340. Besides, a screw 340A is formed on the other end side of each of the carrier pins 340. Further, carrier pin holes 341A and 341B are respectively formed in the carrier 308A and the output shaft flange 308B. The carrier pin 340 is caused to penetrate through the carrier pin holes 341A and 341B with a spacer 344 interposed therebetween. A nut 346 is threadably engaged with the screw 340A of the carrier pin 340, and is tightened. Thus, the carrier 308A and the output shaft flange 308B are connected.

As already referred to in the description of the group of "medium" change gear ratios, the connection of the carrier 308A and the output shaft flange 308B by the carrier pins 340 is not always indispensable. Since, however, both the planet frames 308A and 308B are unitarily rotated at equal speeds without fail by the presence of the carrier pins 340, the supporting pins 314 can be effectively prevented from undergoing eccentric loads tangential to the orbits of their revolutions around the sun gear 302, and they can be always supported favorably.

Next, the operation of the geared motor belonging to the group of "low" change gear ratios will be described.

When the motor shaft 330 is rotated, the input shaft 310 is rotated through the coupling 311, and the sun gear 302 held in spline connection with the input shaft 310 is rotated at the same speed. In accordance with the rotation of the sun gear 302, the first planet gear 304A held in mesh with the sun gear 302 is rotated, and the second planet gear 304B held in spline connection with the first planet gear 304A is accordingly rotated unitarily with the first planet gear 304A. As a result, the second planet gear 304B revolves round the periphery of the sun gear 302 in inner gearing with the internal gear 306 which is fixed to the casing 312. In this case, the rotation of the sun gear 302 is received by the first planet gear 304A having the smaller number of teeth, and the received rotation is converted into the rotation of the second planet gear 304B having the larger number of teeth, whereupon the resulting rotation is transmitted to the internal gear 306. Therefore, a substantial speedup is effected here, whereby a very "low" reduction gear ratio of, for example, 1/2 is realized.

When the unitary structure consisting of the first and second planet gears 304A and 304B revolves round the periphery of the sun gear 302 in inner gearing with the internal gear 306 fixed to the casing 312, the revolutions are transmitted to the pair of planet frames, namely, the carrier 308A and the output shaft flange 308B through the supporting pins 314 in the same manner as in the construction of the "medium" reduction gear ratios stated before. The power of the revolutions transmitted to the side of the output shaft flange 308B is transmitted to the output shaft 320 directly, while the power of the revolutions transmitted to the side of the carrier 308A is transmitted thereto through the carrier pins 340 and the output shaft flange 308B.

Herein, the carrier 308A and the output shaft flange 308B are supported by the casing 312 through the respective ball bearings 316A and 316B independently of each other, so that the mounting and rotating precisions of the supporting pins 314 can be kept very high. Besides, a high rigidity is ensured for the whole reduction gears against loads in radial directions as exerted from the side of the output shaft 320. Accordingly, the input shaft 310 and the other members can also be supported at high precisions. Therefore, the sun gear 302 need not be floated, and noise in the operation of the geared motor can be reduced to that extent (because one factor for the noise increase is eliminated). This functional effect is basically the same as achieved by the geared motor of the group of "medium" change gear ratios stated before. Further, also in the geared motor of the group of "low" change gear ratios, since the carrier 308A and the output shaft flange 308B are securely fixed and connected through the carrier pins 340, they rotate at the same speed without fail, and the eccentric loads tangential to the orbits of the revolutions of the supporting pins 314 around the sun gear 302 can be correspondingly prevented from acting on these pins 314.

Moreover, the supporting pins 314 are adapted to slidingly rotate relative to the first and second planet gears 304A and 304B, and they are also adapted to slidingly rotate relative to the carrier 308A as well as the output shaft flange 308B (they are not fixed to these planet frames). Therefore, the relative sliding speeds between the supporting pins 314 and the unitary structure of the first and second planet gears 304A and 304B are correspondingly lowered. Conjointly with the high mounting precision of the supporting pins 314 themselves, accordingly, the first and second planet gears 304A and 304B can be supported so as to smoothly rotate for a long term (without the provision of bearings which form a cause for the noise increase). Consequently, no shaft noise is involved, so that the noise in the operation of the geared motor is further reduced, and the number of components of the geared motor can be decreased.

Lastly, there will be described the construction of a geared motor having a planetary gear mechanism of oscillating inner gearing system which is used for realizing a change gear ratio in a group of "high" change gear ratios, in the series of geared motors according to the present invention.

Figure 8:
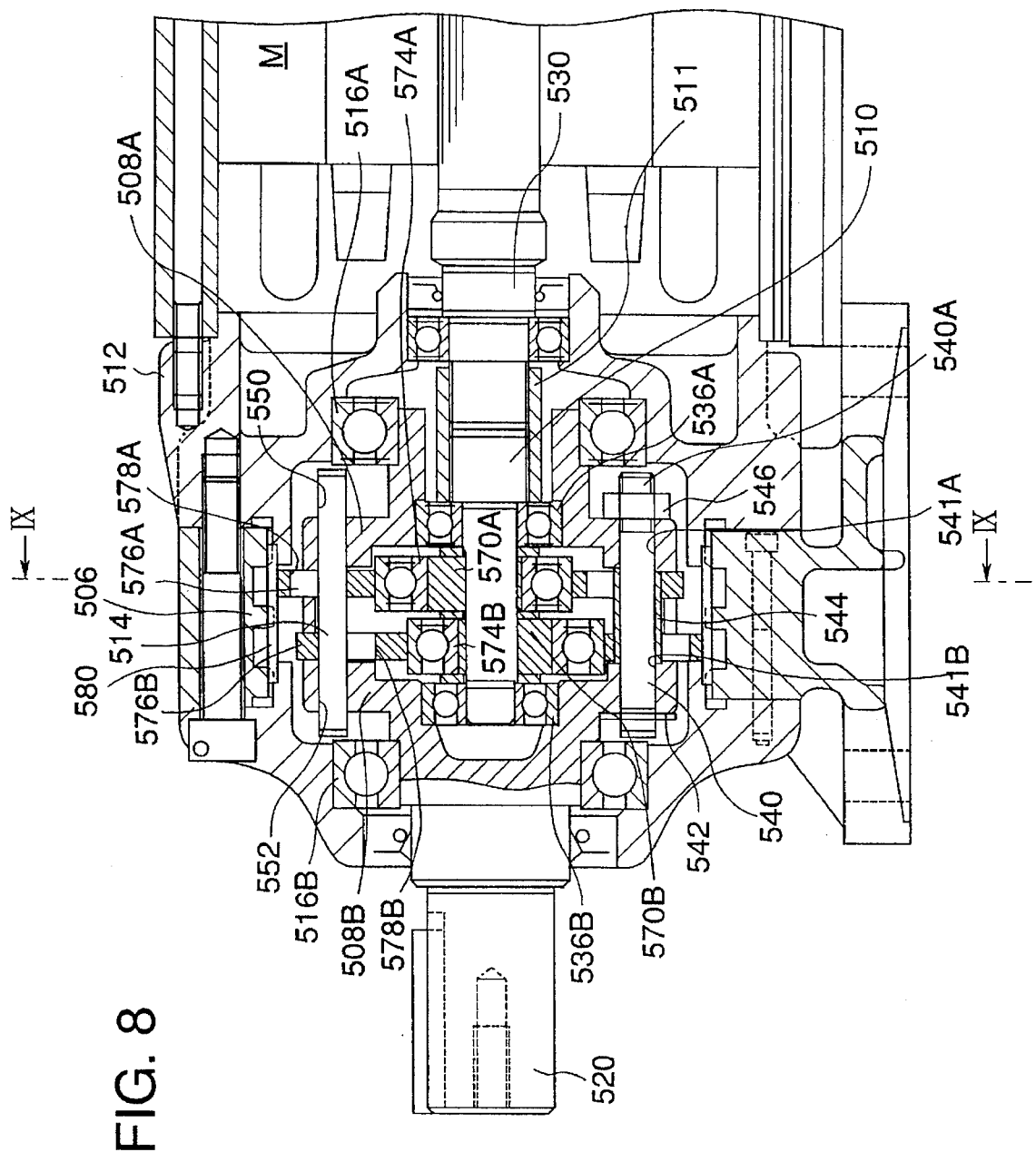
FIG. 8 is a front view of a geared motor belonging to a group of "high" reduction gear ratios in the series to which the present invention is applied, a reduction portion being shown in a fragmentary axial section.
Figure 9:
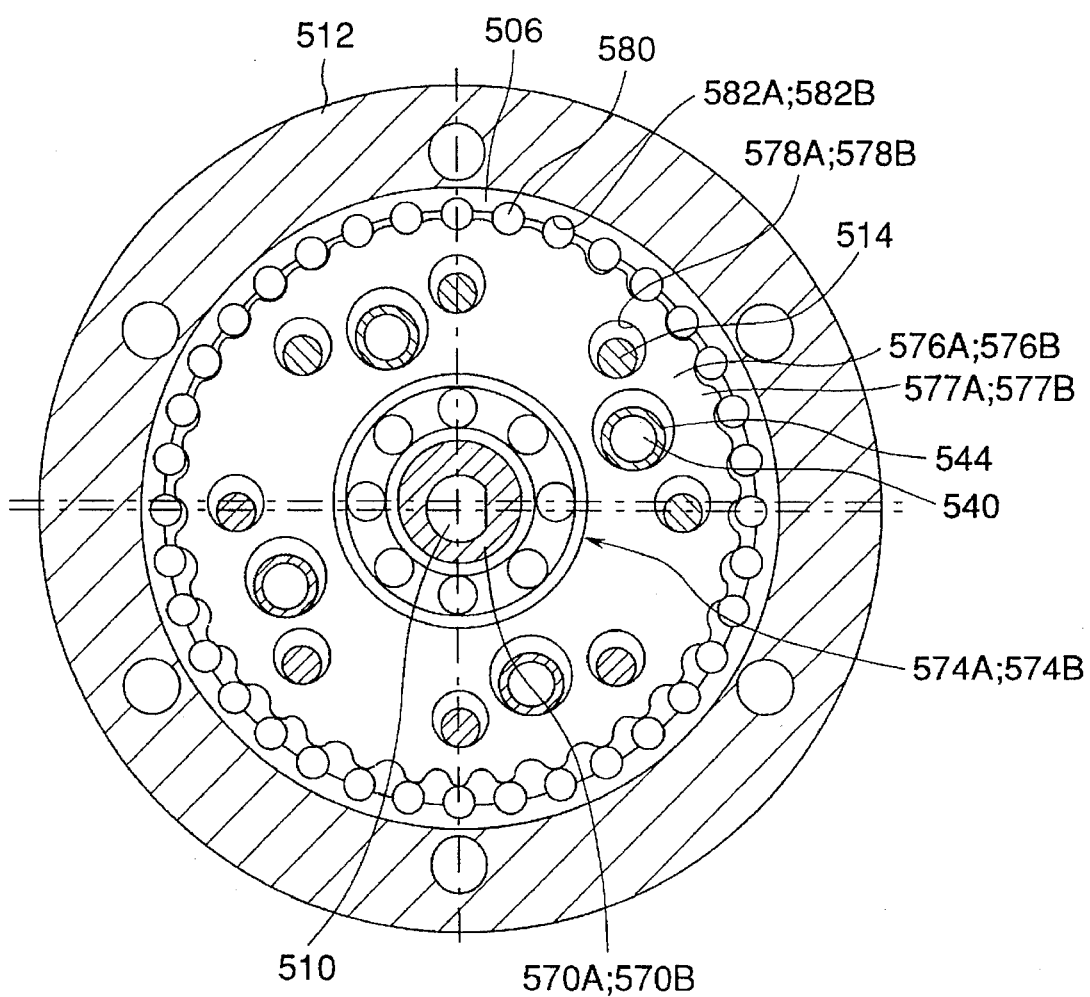
FIG. 9 is a sectional view taken along line IX—IX in FIG. 8.
Figure 15:
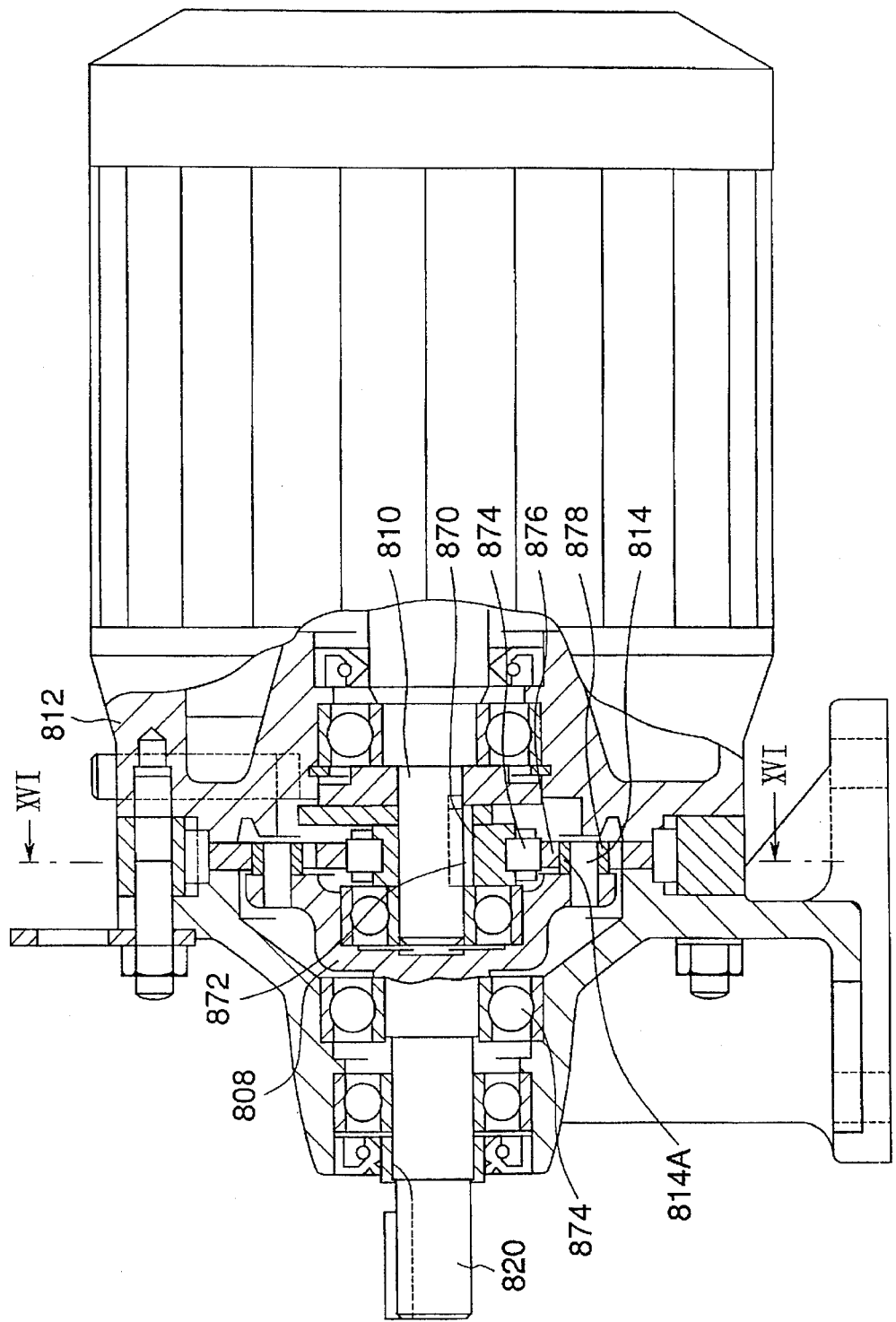
FIG. 15 is a front view of a geared motor having reduction gears based on a planetary gear mechanism of oscillating inner gearing system in the prior art, a reduction portion being shown in a fragmentary axial section.
Figure 16:
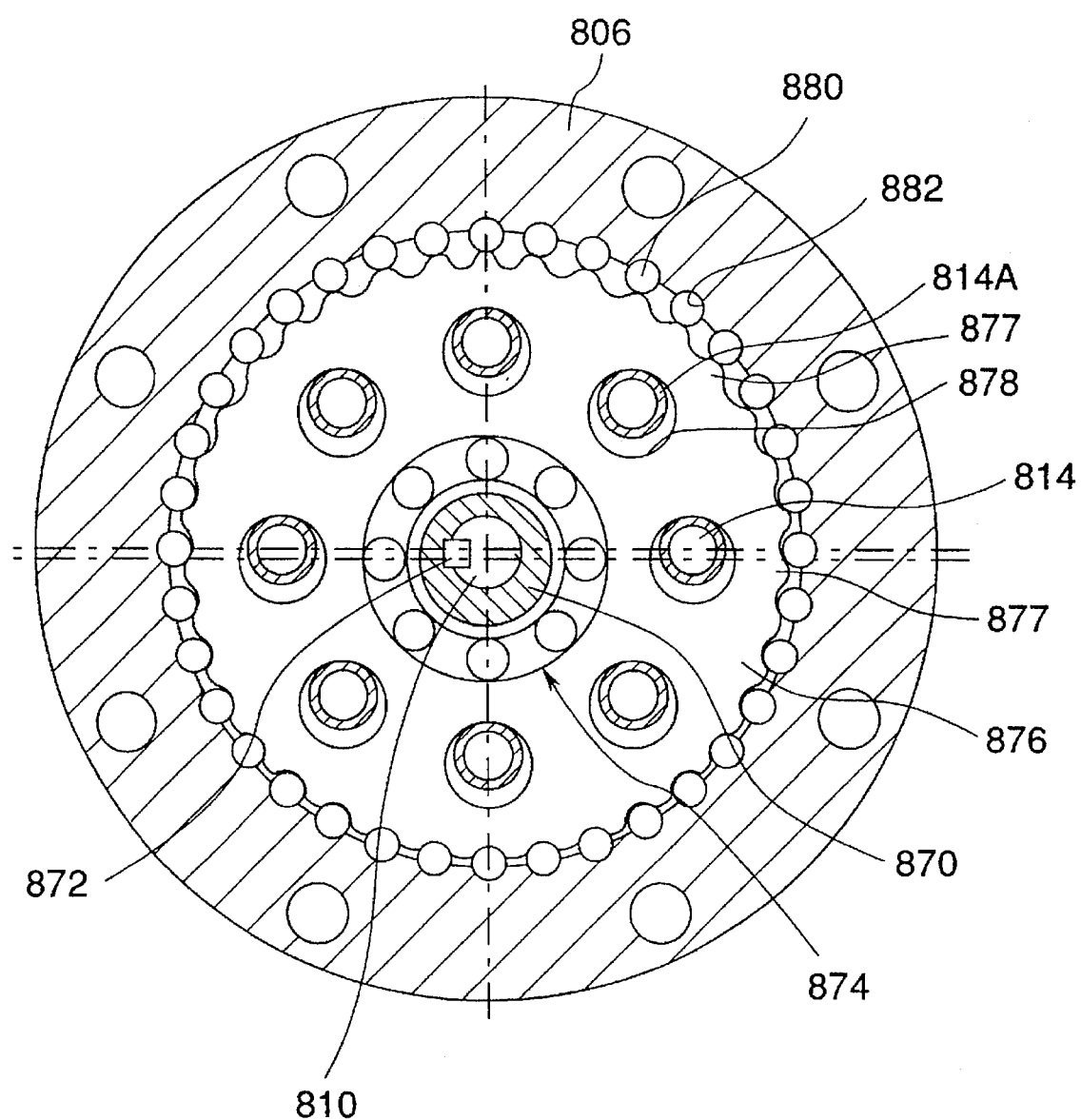
FIG. 16 is a sectional view taken along line XVI—XVI in FIG. 15

FIG. 8 is a front view of the geared motor whose reduction gears are shown in a fragmentary axial section, while FIG. 9 is a sectional view taken along line IV—IV in FIG. 8. Incidentally, components similar to those of the geared motors of the groups of "low" and "medium" change gear ratios in the foregoing embodiments or the prior-art geared motor shown in FIGS. 15 and 16 are respectively assigned symbols having the same two lower digits, as far as possible.

The reduction gears of the geared motor shown in FIGS. 8 and 9 adopt the planetary gear mechanism of the oscillating inner gearing system as the construction of their reduction portion. The planetary gear mechanism of the oscillating inner gearing system includes an input shaft (first shaft) 510, eccentric bodies 570A and 570B which are respectively fitted on the input shaft 510, external gears 576A and 576B which are respectively mounted so as to be capable of eccentric motions relative to the input shaft 510 through the eccentric bodies 570A and 570B, an internal gear 506 with which both the external gears 576A and 576B are in inner gearing, and an output shaft (a second shaft) 520 which is connected to the respective external gears 576A and 576B through means for transmitting only the components of the revolutions of these external gears on the axes thereof (the means including inner pins 514, inner pin holes 578A and 578B, etc.).

The reason why the two external gears 576A and 576B are provided, is that the phases of the eccentric motions of the respective external gears are shifted 180°, thereby to hold a dynamic balance and to attain a strength which endures the "high" reduction gear ratio (a high torque).

The eccentric bodies 570A and 570B are connected with the input shaft 510 formed with the so-called "D cutting". Herein, the input shaft 510 is connected with the motor shaft 530 of a motor (motor proper) M through a coupling 511.

The external gears 576A and 576B are respectively mounted on the eccentric bodies 570A and 570B through bearings 574A and 574B. These external gears 576A and 576B are respectively provided with the plurality of inner pin holes 578A and 578B, in each of which the inner pin (equivalent to a supporting pin) 514 is loosely fitted. The external gears 576A and 576B are respectively formed at their outer peripheries with outward teeth 577A and 577B, each of which has a trochoidal tooth profile. The outward teeth 577A and 577B are in inner gearing with the internal gear 506 which is fixed to a casing 512. The inward teeth of the internal gear 506 are concretely so constructed that outer pins 580 are loosely fitted by the sliding engagement thereof in the walls of corresponding outer pin holes 582A and 582B.

The inner pins 514, which correspond to the inner pins 814 in the prior-art geared motor shown in FIGS. 15 and 16, are supported on both the sides thereof by a pair of planet frames so as to be capable of sliding rotations. Concretely, in this embodiment, the pair of planet frames are constituted by a carrier 508A which is arranged on the input shaft side (the right side as viewed in FIG. 8), and an output shaft flange 508B which is formed so as to be integral with the output shaft 520. The carrier 508A and the output shaft flange 508B are respectively formed with inner-pin holding holes (supporting-pin holding holes) 550 and 552, in which the inner pins 514 have both the ends thereof supported so as to be capable of the sliding rotations.

Both the planet frames, namely, the carrier 508A and the output shaft flange 508B are supported by the casing 512 through bearings 516A and 516B independently of each other so as to be rotatable (coaxially with the input shaft 510). By the way, the bearings 516A and 516B also fulfill the functions of stoppers which serve to prevent the inner pins 514 from coming off in the axial directions thereof.

The internal gear 506 is fixed to the casing 512. The input shaft 510 is supported by the pair of planet frames, namely, the carrier 508A and the output shaft flange 508B through respective ball bearings 536A and 536B. The carrier 508A and the output shaft flange 508B (the pair of planet frames) are securely fixed and connected to each other by carrier pins 540 (which are members different from the inner pins 514). Concretely, a snap ring 542 is fitted on one end side of each of the carrier pins 540. Besides, a female screw 540A is formed on the other end side of each of the carrier pins 540. Further, carrier pin holes 541A and 541B are respectively formed in the carrier 508A and the output shaft flange 508B. The carrier pin 540 is caused to penetrate through the carrier pin holes 541A and 541B with a spacer 544 interposed therebetween. A nut 546 is threadably engaged with the screw 540A of the carrier pin 540, and is tightened. Thus, the carrier 508A and the output shaft flange 508B are connected.

The connecting and supporting construction of the carrier 508A and the output shaft flange 508B is quite the same as that of the carrier 308A (408A) and the output shaft flange 308B (408B) in the group of "low" reduction gear ratios (in the group of "medium" reduction gear ratios) stated before. Thus, the interchangeability of the members is ensured.

Moreover, in this embodiment, the inner rollers (814A in FIGS. 15 and 16) around the inner pins as have hitherto been indispensable are omitted to attain a still lower cost. The reasons why the inner rollers can be omitted in this manner, are as follows: (1) Since the principal reduction part including the inner pins 514 has both its ends supported by the pair of bearings 516A and 516B, the rigidity thereof is very high, and the carrier 508A, output shaft flange 508B and carrier pins 540 can be connected very easily and at a high precision, so that the inner pins 514 can be accurately mounted. (2) Since external radial loads acting on the output shaft 520 can be parried on both the sides by the bearing 516B directly and by the bearing 516A through the carrier pins 540 as well as the carrier 508A, the inner pins 514 are not affected by the external radial loads and are rotated very smoothly.

Incidentally, since each of the inner pins 514 has both its ends supported freely, it is liable to an elastic deformation due to a load ascribable to its bite into the wall of the inner pin hole 578A or 578B, whereby any error attendant upon the working and assemblage of the geared motor or the overhaul and reassemblage thereof can be favorably absorbed. Besides, even when the inner pins 514 have elastically deformed, the geared motor can continue very stable running because the rigidity of the principal reduction part is not ensured by the inner pins 514, but is ensured by the carrier 508A, carrier pins 540 and output shaft flange 508B supported on both their sides by the casing 512.

Next, the operation of the geared motor belonging to the group of "high" change gear ratios will be described.

It is quite similar to the operation of the known prior-art example that the external gears 576A and 576B are oscillatingly rotated with the rotation of the input shaft 510, whereby the rotation of the input shaft 510 is converted into the revolutions of the external gears 576A and 576B at reduced speeds (on the axes thereof) by the gearing between the internal gear 506 and these external gears.

Herein, while the oscillating components of the revolutions of the external gears 576A and 576B are absorbed by clearances defined between the inner pin holes 578A and 578B and the corresponding inner pins 514, only the components thereof on the axes of the external gears 576A and 576B are transmitted to the carrier 508A and the output shaft flange 508B through the inner pins 514, respectively. The power of the revolving component transmitted to the side of the carrier 508A is transmitted to the output shaft 520 through the carrier pins 540.

Figure 10:
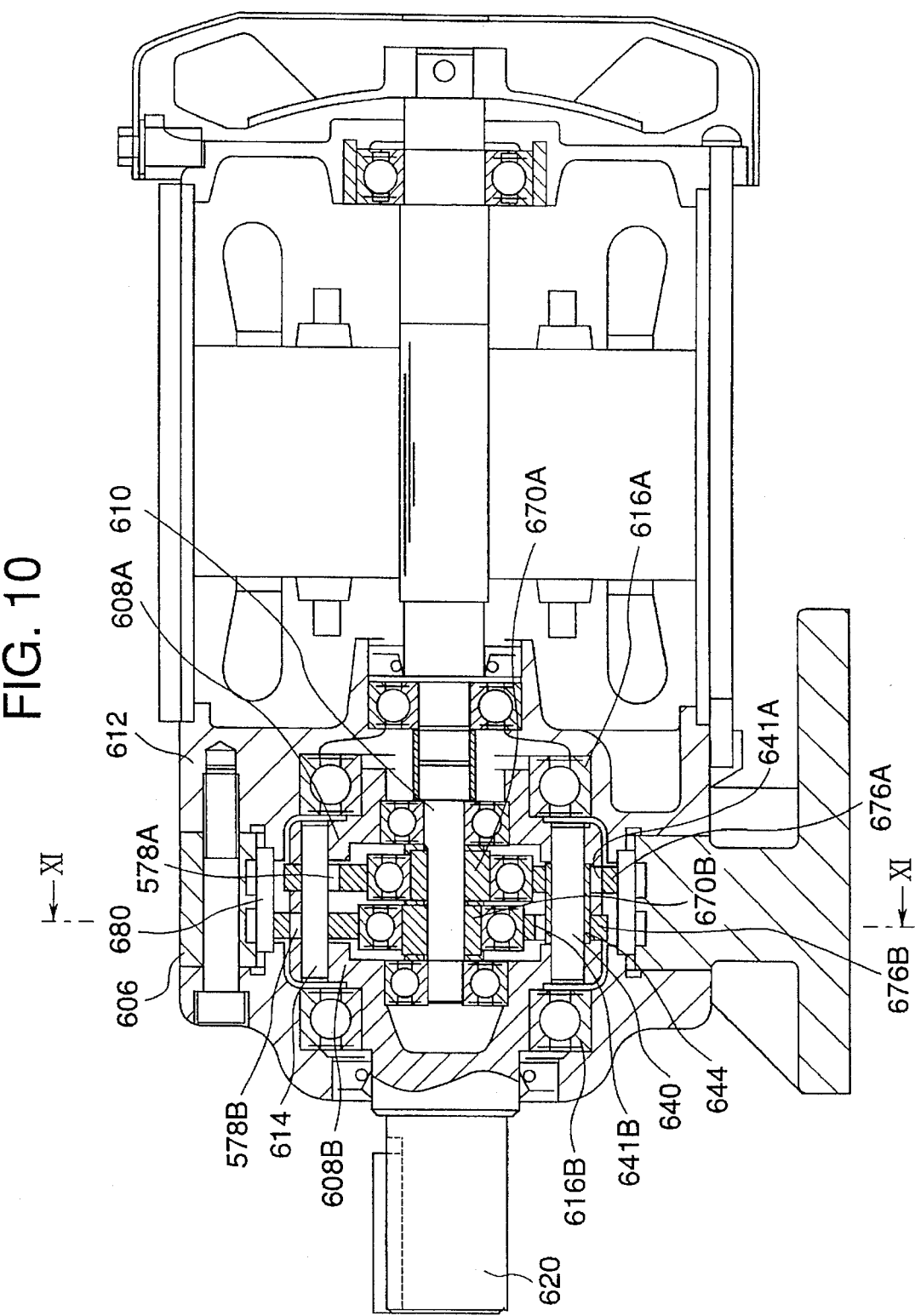
FIG. 10 is a front view of another geared motor belonging to the group of "high" reduction gear ratios in the series to which the present invention is applied, a reduction portion being shown in a fragmentary axial section.
Figure 11:
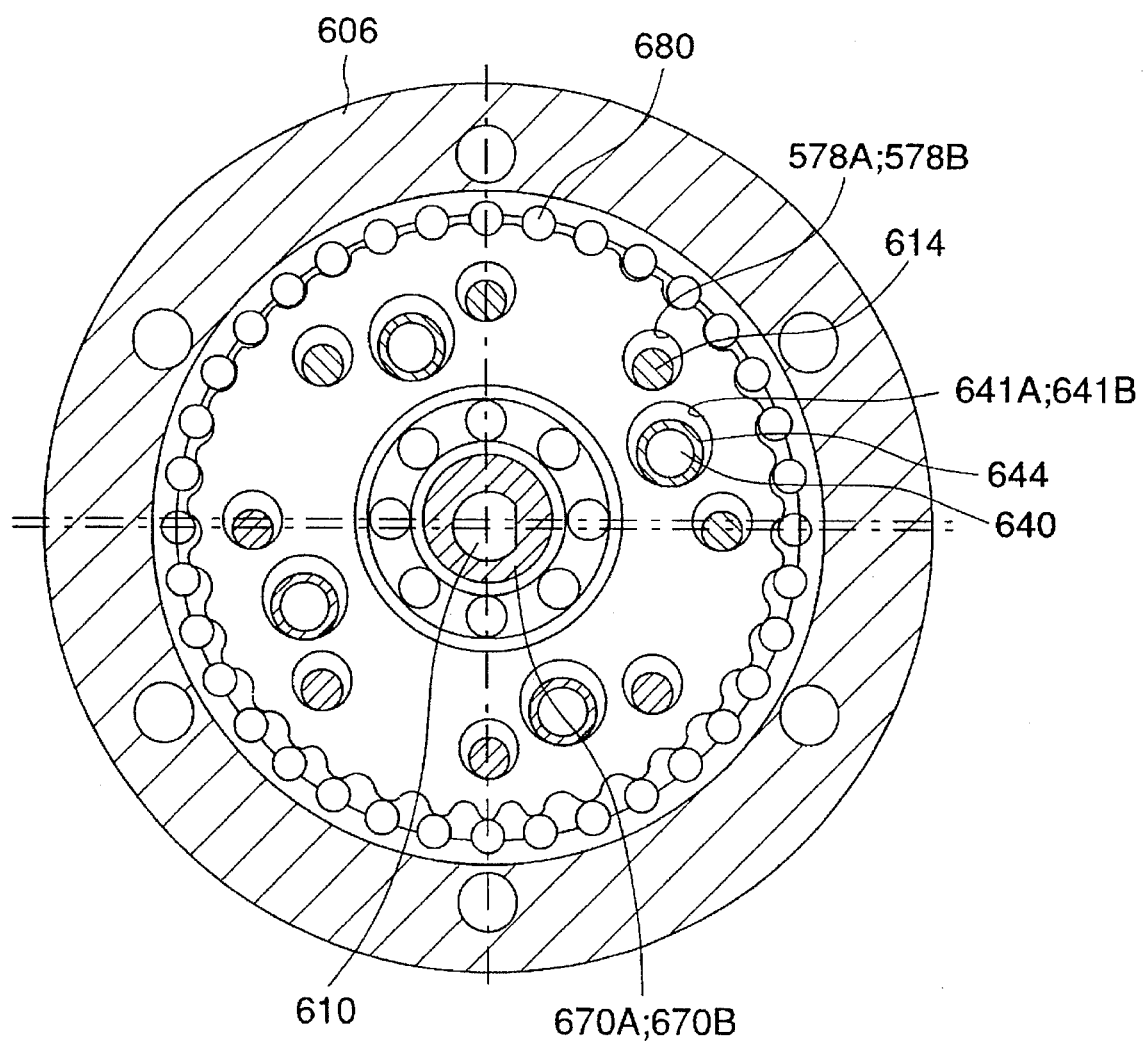
FIG. 11 is a sectional view taken along line XI—XI in FIG. 10.

FIG. 10 is a front view of another example of the geared motor which belongs to the group of "high" reduction gear ratios, reduction gears being shown in a fragmentary axial section, while FIG. 11 is a sectional view taken along line XI—XI in FIG. 10. Whereas the foregoing embodiment shown in FIGS. 8 and 9 is of the type in which the reduction gears themselves can be overhauled, this embodiment shown in FIGS. 10 and 11 is of the type in which the reduction gears themselves cannot be overhauled. By the way, in FIGS. 10 and 11, parts similar to those of the geared motors described before are respectively assigned symbols having the same two lower digits, as far as possible.

Referring to FIGS. 10 and 11, an output shaft 620 includes a flange (a planet frame) 608B, into which one end of each of carrier pins (carrier members) 640 being members different or separate from the output shaft flange 608B is snugly inserted (is pressedly inserted). The other end of each of the carrier pins 640 is snugly inserted (is pressedly inserted) into a carrier (a planet frame) 608A.

The output shaft flange 608B, carrier pins 640 and carrier 608A are supported on both the sides thereof by a casing 612 through a pair of bearings 616A and 616B.

A spacer 644 in the shape of a pipe is snugly fitted (is pressedly fitted) on substantially the middle part of each carrier pin 640 in the axial direction thereof. Accordingly, even when the insertion depths of the carrier pins 640 into the carrier 608A or the output shaft flange 608B are somewhat discrepant, the distance between the carrier 608A and the output shaft flange 608B is held constant without fail owing to the function of the spacers 644. Moreover, equal distances can be easily ensured at the parts of all the carrier pins 640 numbering four.

External gears 676A and 676B are respectively formed with carrier pin holes (through holes) 641A and 641B through which the corresponding carrier pins 640 penetrate. The carrier pin hole 641A (641B) has such a size that, even when the external gear 676A (676B) has oscillated, it does not come into touch with the carrier pin 640.

Inner pins 614 are pressedly inserted into the carrier 608A and the output shaft flange 608B. Accordingly, the inner pins 614 cannot rotate freely. In practical use, however, any problem is not especially posed for the following reasons:

(1) Since each of the inner pins 614 is in the shape of a simple cylinder, it can be machined with mirror finishing from a hard material easily (at low cost). (2) Owing to the adopted construction in which the reduction mechanism is held between the pair of bearings 616A and 616B so as to be supported on both its sides, the rigidity of the whole reduction gears can be rendered very high, and the inner pins 614 can be supported in a very stable state. (3) Since the inner pins 614 and the carrier pins 640 are mounted separately from each other, the carrier pins 640 take charge of radial loads flowing in from the output shaft 620, etc., and the inner pins 614 are secure from undergoing intense radial loads, so that they can be supported in a still stabler state.

Next, the operation of this embodiment will be described.

It is quite similar to the operation described before that the external gears 676A and 676B are oscillatingly rotated with the rotation of an input shaft 610, whereby the rotation of the input shaft 610 is converted into the revolutions of the external gears 676A and 676B at reduced speeds (on the axes thereof) by the gearing between these external gears and outer pins 680 corresponding to the inward teeth of an internal gear 606.

Herein, while the oscillating components of the revolutions of the external gears 676A and 676B are absorbed by clearances defined between inner pin holes 578A and 578B and the corresponding inner pins 614, only the components thereof on the axes of the external gears 676A and 676B are transmitted to the carrier 608A and the output shaft flange 608B through the inner pins 614, respectively. The turning force of the revolving component transmitted to the carrier 608A is transmitted to the output shaft 620 through the carrier pins 640.

Since external radial loads acting on the output shaft 620 can be parried on both the sides by the bearing 616B directly and by the bearing 616A through the carrier pins 640 as well as the carrier 608A, the inner pins 614 are not affected by the external radial loads and are rotated very smoothly.

That is, according to this embodiment, the reduction mechanism part has both its ends supported by the pair of bearings 616A and 616B, so that the rigidity thereof is very high, and the output shaft flange 608B, carrier pins 640 and carrier 608A can be connected very easily and at a high precision. A further effect is that a lower cost can be attained by omitting inner rollers (814A in the prior-art example shown in FIGS. 15 and 16) for the inner pins 614 and nuts (546 in FIG. 8) for the carrier pins 640 or the like.

In FIGS. 10 and 11, symbols 670A and 670B denote eccentric bodies.

Figure 12:
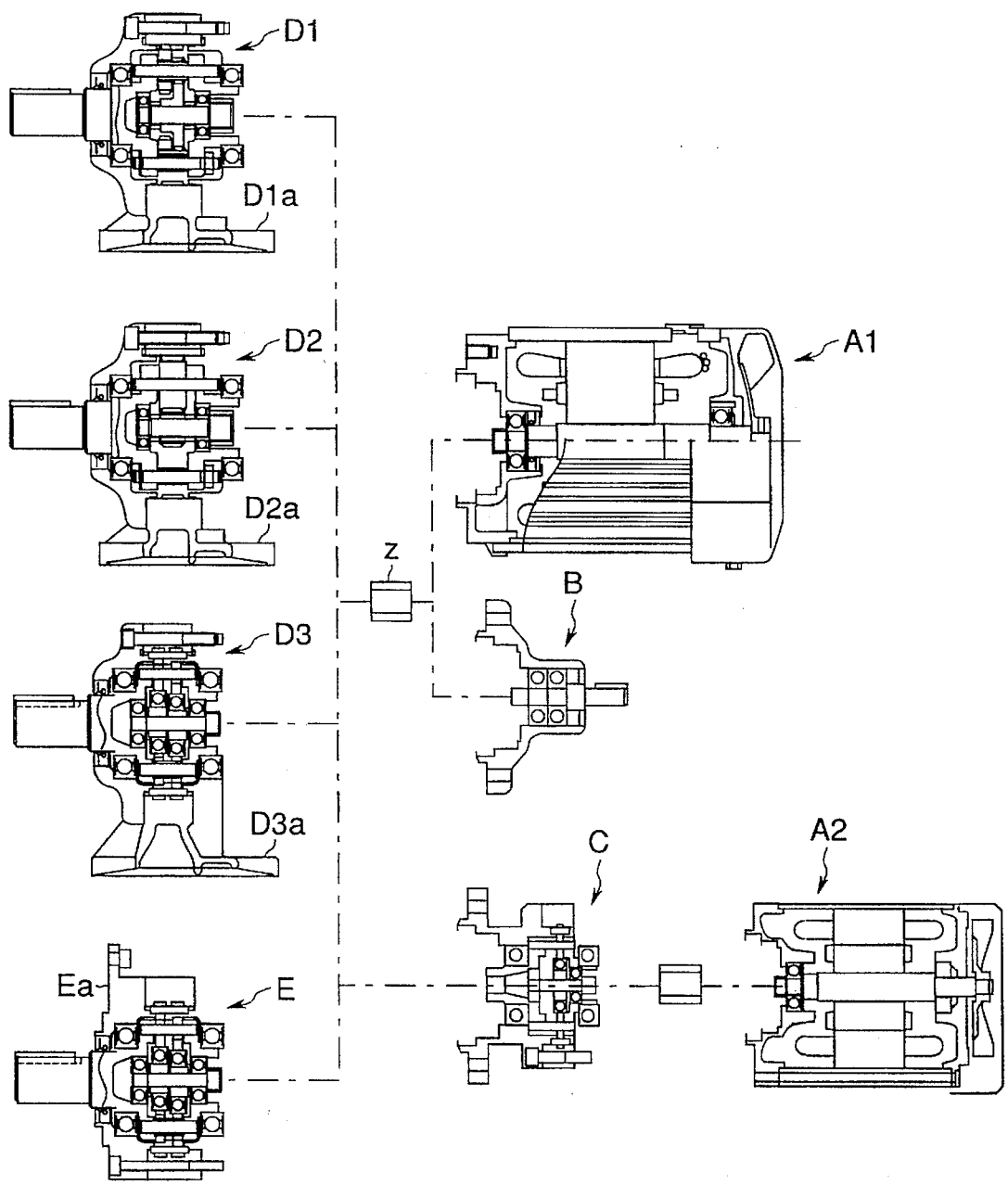
FIG. 12 is a schematic view of an overall system showing a series into which the series according to the present invention is further developed.
Figure 13:
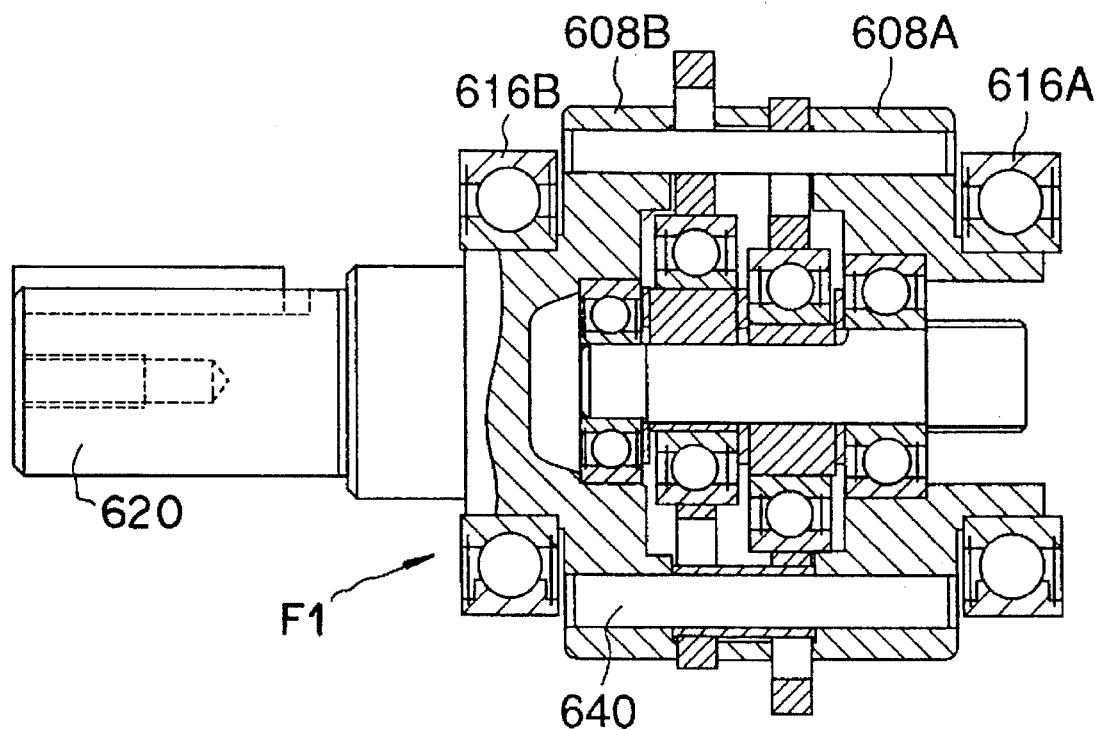
FIG. 13 is a schematic view showing an example of a reduction portion pack in the developed series.

FIGS. 12 and 13 illustrate further developed series of geared motors which are based on the series according to the present invention.

Here, each of motor direct-connection types A1 and A2 is for directly connecting a motor and a planetary gear mechanism so as to be unitary.

A both-shaft type B is for connecting a driving source (such as a motor) to an input shaft by means of a coupling or the like. The both-shaft type B is also called a "reducer".

A two-stage type C is for attaining a "high" reduction gear ratio by the combination of two stages of planetary gear mechanisms.

Each of these input side portions is connected to the input shaft of a planetary gear mechanism portion through joint splines Z. For this purpose, subject to the same framework No., the assorted dimensions of the input side portions and the planetary gear mechanism portions are equalized among the group of products.

Base installation types D1, D2 and D3, and a flange type E are prepared as the planetary gear mechanism portions. The base installation types D1, D2 and D3 are used when the geared motors are to be installed on mating machines at respective bases D1a, D2a and D3a. On the other hand, the flange type E is used when the geared motor is to be attached to a mating machine at a flange Ea which extends perpendicularly to shafts. Incidentally, the base installation types D1, D2 and D3 in the FIG. 12 correspond to the modified simple planetary gear mechanism, the simple planetary gear mechanism and the planetary gear mechanism of oscillating inner gearing system, respectively, and the details of the planetary gear mechanisms are as have already been described. As the flange type E, only the geared motor including the planetary gear mechanism of oscillating inner gearing system is prepared here. Of course, however, a geared motor including the simple planetary gear mechanism or the modified simple planetary gear mechanism may well be prepared as this type E.

All the constituent types A1–E are put into the shapes of units. Oil seal measures are taken so that the units may be adapted for storage, transportation etc. without any hindrance as they are. Besides, the assorted dimensions of the units for the Joint splines Z are made common.

A reduction portion pack F1 shown in FIG. 13 is such that only the reduction gear mechanism of the geared motor is taken out and is put into the shape of a unit. This unit is shared by the base installation types D1, D2 and D3 and the flange type E. Owing to the unitized reduction gear mechanism, the alteration of a reduction gear ratio within the same framework No. can be effected very easily. Here, the reduction portion pack F1 corresponds to the planetary gear mechanism of oscillating inner gearing system, and such packs affording reduction gear ratios of 1/6–1/119 are prepared. Reduction portion packs F2 (FIG. 6) of the simple planetary gear mechanism affording reduction gear ratios of 1/3–1/7 and reduction portion packs F3 (FIG. 1) of the modified simple planetary gear mechanism affording reduction gear ratios of 1/2–1/3 are prepared quite similarly.

Incidentally, FIGS. 12 and 13 merely exemplify the geared motors in the developed series. Regarding the motor direct-connection types A1 and A2 by way of example, in spite of the same horsepower, there are prepared unshown multifarious motors with accessory control circuits taken into account, such as a mere induction motor which is conventional, a motor which is furnished with a brake, a motor which has an inverter control circuit and can accordingly control revolutions per minute at a constant torque, and a motor which is completely rendered waterproof in order to enhance safety. Likewise, several variations are prepared for each of the other constituents B–E.

As understood from the above description, the geared motor in the group of "low" reduction gear ratios (FIGS. 1–5: reference numerals of three hundred odd), the geared motor in the group of "medium" reduction gear ratios (FIGS. 6 and 7: reference numerals of four hundred odd) and the geared motor in the group of "high" reduction gear ratios (FIGS. 8 and 9, or FIGS. 10 and 11: reference numerals of five or six hundred odd) have the respective principal reduction parts of the modified simple planetary gear mechanism, the simple planetary gear mechanism and the oscillating inner-gearing planetary gear mechanism which are structurally different. Nevertheless, the carriers 308A, 408A and 508A (or 608A) and the output shaft flanges 308B, 408B and 508B (or 608B) for supporting both the sides of the respective principal reduction parts on the casings 312, 412 and 512 (or 612), the carrier pins 340, 440 and 540 (or 640) for connecting the carriers and the output shaft flanges, etc. are endowed with quite the same constructions and sizes as far as the same framework No. is concerned. Accordingly, the reduction mechanism can be connected with a mating member through the output shaft 320, 420 or 520 (or 620), or with the motor side of the geared motor through the casing 312, 412 or 512 (612) freely while the perfect interchangeability is held.

On that occasion, owing to the principal reduction part which is unitized in the sealed state, the attachment and detachment of the reduction mechanism, the attachment and detachment of the geared motor to and from the mating machine, and the storage and transportation of the reduction mechanism as well as the geared motor can be effected very easily.

Moreover, in the group of "low" reduction gear ratios and the group of "medium" reduction gear ratios, the floating construction of the sun gear and the bearings of the planet gears which form the factors of noise increase are successfully omitted in spite of the adoption of the modified simple planetary gear mechanism or the simple planetary gear mechanism. Therefore, noise reduction can be realized, and the groups of "low" and "medium" reduction gear ratios can coexist with the group of "high" reduction gear ratios based on the planetary gear mechanism of oscillating inner gearing system, in the single (identical) series without a sense of incompatibility.

As thus far described, according to the present invention, change gear ratios of 1/2–1/100 or a wider range of change gear ratios can be attained in a single series based on the unified design concepts of low noise, high rigidity and high durability. Moreover, since each principal gear ratio part is supported at both its ends and is unitized in a sealed state, it can be combined with any of motors and mating machines of various sizes and various sorts at will and with ease at any desired change gear ratio in the aforementioned wide range.

What is claimed is:

1. A series of geared motors comprising a plurality of motors of various characteristics and various speed change gear units of different types in combination, wherein a plurality of change gear ratios can be selected under a condition that assorted dimensions for mating said geared motors with machines are the same, wherein said series of geared motors comprises:

a first group of geared motors constituting a group of various motors combined with speed change gear units having "high" change gear ratios, each said gear unit comprising a single-stage type planetary gear mechanism consisting of an oscillating inner gearing system as a speed change mechanism, said single-stage type planetary gear mechanism including a first shaft, an eccentric body which is fitted on said first shaft, an external gear which is mounted by means of said eccentric body so as to be capable of revolving eccentrically to said first shaft, an internal gear with which said external gear is in inner gearing, transmission means for transmitting only a component of the revolution of said external gear on an axis thereof, and a second shaft which is connected to said external gear through the transmission means;

a second group of geared motors constituting a group of various motors combined with speed change gear units having "low" change gear ratios, each said gear unit comprising a single-stage type simple planetary gear mechanism as a speed change mechanism, said single-stage type simple planetary gear mechanism including a sun gear, a planet gear which is in outer gearing with said sun gear, and an internal gear with which said planet gear is in inner gearing;

wherein a principal gear ratio part of each of said speed change gear units of said geared motors constituting the group of "high" change gear ratios and said speed change gear units of said geared motors constituting the group of "low" change gear ratios is sealably supported at both ends thereof; and wherein assorted dimensions for mating said speed change gear units to motors and to machines are the same so that all said speed change gear units are interchangeable.

2. A series of geared motors as defined in claim 1, wherein:

said speed change gear units of said geared motors constituting said group of "low" change gear ratios include supporting pins which support said planet gear so as to be capable of rotating slidingly, a pair of planet frames which are respectively arranged on both sides of said planet gear in an axial direction thereof and which support both ends of each supporting pin so as to be capable of rotating slidingly, a casing which forms an enclosure of said speed change gears, and a pair of bearings which support the respective planet frames on said casing independently of each other so as to be rotatable coaxially with said sun gear; and said principal gear ratio part is sealably supported in said casing at both ends thereof by said pair of planet frames and said pair of bearings.

3. A series of geared motors comprising a plurality of motors of various characteristics and various speed change gear units in combination, wherein a plurality of change gear ratios can be selected under a condition that complementary dimensions of connection means for mating machines and geared motors are the same, said series of geared motors comprising:

a group of geared motors constituting a group of various motors combined with speed change gear units having "high" change gear ratios, each speed change gear unit comprising a simple planetary gear mechanism as a speed change mechanism of the speed change gear units, said simple planetary gear mechanism including a sun gear, a planet gear which is in outer gearing with said sun gear, and an internal gear with which said planet gear is in inner gearing;

another group of geared motors constituting a group of various motors combined with speed change gear units having "low" change gear ratios, each speed change gear unit comprising a modified simple planetary gear mechanism as a speed change mechanism of the speed change gear unit, said modified simple planetary gear mechanism including a sun gear, a first planet gear which is in outer gearing with said sun gear, a second planet gear which rotates unitarily with said first planet gear and which is formed with a number of teeth larger in number than the number of teeth in said first planet gear, and an internal gear which is in inner gearing with said second planet gear; and a principal gear ratio part of each of said speed change gear units of said geared motors constituting the group of "high" change gear ratios and said speed change gear units of said geared motors constituting the group of "low" change gear ratios is sealably supported at both ends thereof:

wherein assorted dimensions for mating said speed change gear units to motors and to machines are the same so that all said speed change gear units are interchangeable.

4. A series of geared motors as defined in claim 3, wherein:

said speed change gear units of said geared motors constituting said group of "high" change gear ratios each include supporting pins which support said planet gear so as to be capable of rotating slidingly, a pair of planet frames which are respectively arranged on both sides of said planet gear in an axial direction thereof and which support both ends of said each supporting pin so as to be capable of rotating slidingly, a casing which forms an enclosure of said speed change gears, and a pair of bearings which support the respective planet frames on said casing independently of each other so as to be rotatable coaxially with said sun gear; and said principal gear ratio part is sealably supported in said casing at both ends thereof by said pair of planet frames and said pair of bearings.

5. A series of geared motors as defined in claim 3, wherein:

said speed change gear units of said geared motors constituting said group of "low" change gear ratios each include supporting pins which support said first and second planet gears so as to be capable of rotating slidingly, a pair of planet frames which are respectively arranged on both sides of said first and second planet gears in an axial direction thereof and which support both ends of each supporting pin so as to be capable of rotating slidingly, a casing which forms an enclosure of each said speed change gear unit, and a pair of bearings which support the respective planet frames on said casing independently of each other so as to be rotatable coaxially with said sun gear; and said principal gear ratio part is sealably supported in said casing at both ends thereof by said pair of planet frames and said pair of bearings.

6. A series of geared motors comprising a plurality of motors of various characteristics and various speed change gear units of different types in combination, wherein a plurality of change gear ratios can be selected under a condition that complementary dimensions of connecting means for mating machines and geared motors are the same, said series of geared motors comprising:

a first group of geared motors constituting a group of various motors combined with speed change gear units having "high" change gear ratios, each said gear unit comprising a single-stage type planetary gear mechanism consisting of an oscillating inner gearing system as a speed change mechanism, said single-stage type planetary gear mechanism including a first shaft, an eccentric body which is fitted on said first shaft, an external gear which is mounted by means of said eccentric body so as to be capable of revolving eccentrically to said first shaft, an internal gear with which said external gear is in inner gearing, transmission means for transmitting only a component of the revolution of said external gear on an axis thereof, and a second shaft which is connected to said external gear through the transmission means;

a second group of geared motors constituting a group of various motors combined with speed change gear units having "medium" change gear ratios, each said gear unit comprising a single-stage type simple planetary gear mechanism as a speed change mechanism, said single-stage type simple planetary gear mechanism including a sun gear, a planet gear which is in outer gearing with said sun gear, and an internal gear with which said planet gear is in inner gearing;

a third group of geared motors constituting a group of various motors combined with speed change gear units having "low" change gear ratios, each said gear unit comprising a modified simple planetary gear mechanism as a speed change mechanism, said modified simple planetary gear mechanism including a sun gear, a first planet gear which is in outer gearing with said sun gear, a second planet gear which rotates unitarily with said first planet gear and which is formed with a number of teeth larger in number than the number of teeth in said first planet gear, and an internal gear which is in inner gearing with said second planet gear; and a principal gear ratio part of each of said speed change gear units of said geared motors constituting the group of "high" change gear ratios, said speed change gear units of said geared motors constituting the group of "medium" change gear ratios, and said speed change gear units of said geared motors constituting the group of "low" change gear ratios is sealably supported at both ends thereof in a casing of it respective speed change gear unit, said casings all being of identical dimensions;

wherein assorted dimensions for mating said speed change gear units to motors and to machines are the same so that all said speed change gear units are interchangeable.

7. A series of geared motors comprising combinations of a plurality of motors having various characteristics and a plurality of speed change gear units of different types and having a wide range of speed change gear ratios, said series of motors consisting of:

a first group of geared motors constituting a group of various motors combined with speed change gear units having "high" change gear ratios, each of said "high" ratio gear units comprising a single-stage planetary gear mechanism of a type including an oscillating inner gear system;

a second group of geared motors constituting a group of various motors combined with speed change gear units having "medium" change gear ratios, each of said "medium" ratio gear units comprising a single-stage simple planetary gear mechanism of a type including a sun gear, a planet gear meshed with said sun gear, and an internal gear meshed with said planet gear;

a third group of geared motors constituting a group of various motors combined with speed change gear units having "low" change gear ratios, each of said "low" ratio gear units comprising a single-stage modified simple planetary gear mechanism of a type including a sun gear, a first planet gear meshed with said sun gear, a second planet gear which rotates unitarily with said first planet gear and which is formed with a number of teeth larger than the number of teeth of said first planet gear, and an internal gear meshed with said second planet gear;

wherein each motor and speed change gear unit combination of said series of geared motors is manufactured to have identical exterior dimensions, such that any one of said series of geared motors may be replaced with any other geared motor of said series, or any motor or speed change gear unit may be interchangeable respectively with any other motor or speed change gear unit of said series; and wherein a principal gear ratio part of each speed change gear unit of "high", "medium" and "low" ratio is sealably supported at both ends thereof in its respective gear unit, each of said principal gear ratio parts being constructed to be identically supported so that principal gear ratio parts may be replaceably interchangeable within each speed change gear unit, such that a principal gear ratio part of any gear unit may be replaced with any other principal gear ratio part of the same or different type of gear mechanism to change the gear ratio of a speed change gear unit.

8. A series of speed change gear units for forming a series of geared motors having various change gear ratios, each said speed change gear unit comprising:

a series of identical casings which form an enclosure for a principal gear ratio part of a speed change gear unit;

a plurality of planetary gear mechanisms having different change gear ratios, said mechanisms including mechanisms of a plurality of different types to serve as a principle gear ratio part, each such mechanism having a pair of planet flames which are respectively arranged on ends of the mechanism in an axial direction; and a pair of bearings which support the respective frames of a planetary gear mechanism on said casing independently of each other so as to be rotatable coaxially thereon;

wherein each of said different types of planetary gear mechanisms is formed in dimensions such that any one of said mechanisms may be interchangeably placed in a casing as a principal gear ratio part of a speed change gear unit and sealably supported therein at both ends by said pair of planet frames and said pair of bearings, various gear change ratios of said principle gear ratio parts placed in said casings thus providing a series of identical speed change gear units having a range from a ratio of 1/2 or lower to a ratio of 1/100 or higher.

9. A series of speed change gear units as defined in claim 8, wherein said plurality of planetary gear mechanisms includes at least two types of mechanisms selected from the group including a single-stage planetary gear mechanism having an oscillating inner gear system, a single-stage simple planetary gear mechanism, and a single-stage modified simple planetary gear mechanism.

10. A series of speed change gear units as defined in claim 9 wherein at least one of said plurality of planetary gear mechanisms has a "high" change gear ratio, said mechanism comprising a single-stage planetary gear mechanism of a type including an oscillating inner gear system.

11. A series of speed change gear units as defined in claim 9 wherein at least one of said planetary gear mechanisms has a "medium" change gear ratio, said mechanism comprising a single-stage simple planetary gear mechanism of a type including a sun gear, a planet gear meshed with said sun gear, and an internal gear meshed with said planet gear.

12. A speed change gear unit as defined in claim 9 wherein at least one of said planetary gear mechanisms has a "low" change gear ratio, said mechanism comprising a single-stage modified simple planetary gear mechanism of a type including a sun gear, a first planet gear meshed with said sun gear, a second planet gear which rotates unitarily with said first planet gear and which is formed with a number of teeth larger than the number of teeth of said first planet gear, and an internal gear meshed with said second planet gear.

* * * * *